US011993235B2

(12) United States Patent
Martin

(10) Patent No.: US 11,993,235 B2
(45) Date of Patent: May 28, 2024

(54) BRAKE MONITORING SYSTEMS FOR RAILCARS

(71) Applicant: AMSTED RAIL COMPANY, INC., Chicago, IL (US)

(72) Inventor: Andrew H. Martin, West Chester, PA (US)

(73) Assignee: AMSTED RAIL COMPANY, INC., Chicago, IL (US)

(*) Notice: Subject to any disclaimer, the term of this patent is extended or adjusted under 35 U.S.C. 154(b) by 153 days.

(21) Appl. No.: 17/685,822

(22) Filed: Mar. 3, 2022

(65) Prior Publication Data

US 2023/0035869 A1 Feb. 2, 2023

Related U.S. Application Data

(63) Continuation of application No. 16/510,838, filed on Jul. 12, 2019, now Pat. No. 11,312,350.

(Continued)

(51) Int. Cl.
*B60T 17/22* (2006.01)
*B60T 8/17* (2006.01)
*B61L 15/00* (2006.01)

(52) U.S. Cl.
CPC .......... *B60T 17/228* (2013.01); *B60T 8/1705* (2013.01); *B60T 17/221* (2013.01);
(Continued)

(58) Field of Classification Search
CPC .... B60T 17/228; B60T 17/221; B60T 8/1705; B60T 2270/88; B60T 13/66;
(Continued)

(56) References Cited

U.S. PATENT DOCUMENTS 3,718,040 A 2/1973 Freeman et al.
3,854,417 A 12/1974 MacDonnell et al.
(Continued)

FOREIGN PATENT DOCUMENTS

BR PI0709492 7/2011
BR PI0709515 7/2011
(Continued)

OTHER PUBLICATIONS

International Search Report and Written Opinion dated Nov. 29, 2019 issued in International Application No. PCT/US2019/041734.
(Continued)

*Primary Examiner* — Russell Frejd
(74) *Attorney, Agent, or Firm* — Fox Rothschild LLP

(57) ABSTRACT

A system and method for detecting the operational status of a brake system on a railcar. The system receives from a sensor an indication of the magnitude of a braking force applied by the braking system in response to an instruction to increase or decrease the braking force. It compares the response to possible responses of the braking system in view of the instruction provided. Based on the comparison, the system generates at least one of a message and/or an alert indicating the status of the brake system. Additional sensors, including a pressure sensor on a brake pipe of the railcar, can be added for additional functionality.

40 Claims, 30 Drawing Sheets

Related U.S. Application Data

(60) Provisional application No. 62/697,054, filed on Jul. 12, 2018.

(52) U.S. Cl.
CPC ....... *B61L 15/0018* (2013.01); *B61L 15/0072* (2013.01); *B61L 15/0081* (2013.01); *B61L 15/009* (2013.01); *B60T 2270/88* (2013.01)

(58) Field of Classification Search
CPC ............... B60T 13/665; B61L 15/0018; B61L 15/0072; B61L 15/0081; B61L 15/009; B60H 13/00; B60H 15/00
See application file for complete search history.

(56) References Cited

U.S. PATENT DOCUMENTS

| | | |
|---|---|---|
| 4,042,813 A | 8/1977 | Johnson |
| 4,134,464 A | 1/1979 | Johnson et al. |
| 4,296,707 A | 10/1981 | Kennedy |
| 4,368,927 A | 1/1983 | Billingsley et al. |
| 4,487,060 A | 12/1984 | Pomeroy |
| 4,503,705 A | 3/1985 | Polchaninoff |
| 4,801,288 A | 1/1989 | Schmitt et al. |
| 4,812,826 A | 3/1989 | Kaufman et al. |
| 4,859,000 A | 8/1989 | Deno et al. |
| 4,905,795 A | 3/1990 | Rains |
| 4,934,877 A | 6/1990 | Haverick et al. |
| 4,946,229 A | 8/1990 | Deno et al. |
| 4,977,577 A | 12/1990 | Arthur et al. |
| 5,038,605 A | 8/1991 | Tews et al. |
| 5,140,849 A | 8/1992 | Fujita et al. |
| 5,347,871 A | 9/1994 | D'Andrea et al. |
| 5,372,435 A | 12/1994 | Genero et al. |
| 5,381,090 A | 1/1995 | Adler et al. |
| 5,381,692 A | 1/1995 | Winslow et al. |
| 5,394,137 A | 2/1995 | Orschek |
| 5,440,184 A | 8/1995 | Samy et al. |
| 5,446,451 A | 8/1995 | Grosskopf, Jr. |
| 5,503,030 A | 4/1996 | Bankestrom |
| 5,603,556 A | 2/1997 | Klink |
| 5,633,628 A | 5/1997 | Denny et al. |
| 5,642,944 A | 7/1997 | Dublin, Jr. et al. |
| 5,682,139 A | 10/1997 | Pradeep et al. |
| 5,691,980 A | 11/1997 | Welles, II et al. |
| 5,701,974 A | 12/1997 | Kanjo et al. |
| 5,810,485 A | 9/1998 | Dublin, Jr. et al. |
| 5,986,547 A | 11/1999 | Korver et al. |
| 6,006,868 A | 12/1999 | Klink |
| 6,014,600 A | 1/2000 | Ferri et al. |
| 6,127,672 A | 10/2000 | Danisch |
| 6,161,962 A | 12/2000 | French et al. |
| 6,170,619 B1 | 1/2001 | Sheriff et al. |
| 6,175,784 B1 | 1/2001 | Jicha et al. |
| 6,179,471 B1 | 1/2001 | Moretti et al. |
| 6,184,798 B1 | 2/2001 | Egri |
| 6,195,600 B1 | 2/2001 | Kettle, Jr. |
| 6,237,722 B1 | 5/2001 | Hammond et al. |
| 6,263,265 B1 | 7/2001 | Fera |
| 6,301,531 B1 | 10/2001 | Pierro et al. |
| 6,324,899 B1 | 12/2001 | Discenzo |
| 6,339,397 B1 | 1/2002 | Baker |
| 6,397,978 B1 | 6/2002 | Jackson et al. |
| 6,441,324 B1 | 8/2002 | Stimpson |
| 6,474,450 B1 | 11/2002 | Ring et al. |
| 6,474,451 B1 | 11/2002 | O'Brien, Jr. |
| 6,487,478 B1 | 11/2002 | Azzaro et al. |
| 6,535,135 B1 | 3/2003 | French et al. |
| 6,668,216 B2 | 12/2003 | Mays |
| 6,695,483 B2 | 2/2004 | Sakatani et al. |
| 6,739,675 B1 | 5/2004 | Scharpf et al. |
| 6,823,242 B1 | 11/2004 | Ralph |
| 6,882,851 B2 | 4/2005 | Sugar et al. |
| 6,945,098 B2 | 9/2005 | Olson |
| 6,948,856 B2 | 9/2005 | Takizawa et al. |
| 7,014,368 B2 | 3/2006 | Morita et al. |
| 7,018,106 B2 | 3/2006 | Okada |
| 7,034,660 B2 | 4/2006 | Watters et al. |
| 7,114,596 B2 | 10/2006 | Borugian |
| 7,180,019 B1 | 2/2007 | Chiou et al. |
| RE40,099 E | 2/2008 | Stephens et al. |
| 7,336,156 B2 | 2/2008 | Arita et al. |
| 7,538,672 B2 | 5/2009 | Lockyer et al. |
| 7,657,349 B2 | 2/2010 | Hawthorne |
| 7,688,218 B2 | 3/2010 | LeFebvre et al. |
| 7,698,962 B2 | 4/2010 | LeFebvre et al. |
| 7,705,743 B2 | 4/2010 | Barone et al. |
| 8,033,236 B2 | 10/2011 | Michel et al. |
| 8,060,264 B2 | 11/2011 | Oestermeyer et al. |
| 8,212,685 B2 | 7/2012 | LeFebvre et al. |
| 8,244,411 B2 | 8/2012 | Baker |
| 8,370,006 B2 | 2/2013 | Kumar et al. |
| 8,560,151 B2 | 10/2013 | Armitage et al. |
| 8,672,273 B2 | 3/2014 | Brown et al. |
| 8,751,290 B2 | 6/2014 | Schullian et al. |
| 8,763,637 B2 | 7/2014 | Soldo et al. |
| 8,820,685 B2 | 9/2014 | Michaut |
| 8,823,537 B2 | 9/2014 | LeFebvre et al. |
| 9,026,281 B2 | 5/2015 | Murphy et al. |
| 9,365,223 B2 | 6/2016 | Martin et al. |
| 9,663,092 B2 | 5/2017 | Martin et al. |
| 9,663,124 B2 | 5/2017 | LeFebvre et al. |
| 9,744,980 B2 | 8/2017 | Henry et al. |
| 9,981,673 B2 | 5/2018 | Martin et al. |
| 10,137,915 B2 | 11/2018 | LeFebvre et al. |
| 10,267,433 B2 | 4/2019 | Brown et al. |
| 10,343,700 B2 | 7/2019 | Brundisch |
| 10,539,241 B2 | 1/2020 | Jackson et al. |
| 2002/0017439 A1 | 2/2002 | Hill et al. |
| 2002/0049520 A1 | 4/2002 | Mays |
| 2002/0111726 A1 | 8/2002 | Dougherty et al. |
| 2003/0058091 A1 | 3/2003 | Petersen et al. |
| 2003/0097885 A1 | 5/2003 | Kell |
| 2003/0146821 A1 | 8/2003 | Brandt |
| 2003/0182030 A1 | 9/2003 | Kraeling et al. |
| 2004/0117076 A1 | 6/2004 | Horst |
| 2004/0126043 A1 | 7/2004 | Ito |
| 2004/0201464 A1 | 10/2004 | Oonishi |
| 2004/0251058 A1 | 12/2004 | Carr et al. |
| 2005/0028596 A1 | 2/2005 | Gall |
| 2005/0194497 A1 | 9/2005 | Matzan |
| 2005/0259598 A1 | 11/2005 | Griffin et al. |
| 2005/0259619 A1 | 11/2005 | Boettle et al. |
| 2005/0268813 A1 | 12/2005 | Van Auken |
| 2006/0018141 A1 | 1/2006 | Chai et al. |
| 2006/0042734 A1 | 3/2006 | Turner et al. |
| 2006/0080048 A1 | 4/2006 | Kessler et al. |
| 2006/0154398 A1 | 7/2006 | Qing et al. |
| 2006/0158181 A1 | 7/2006 | Shoji |
| 2006/0181413 A1 | 8/2006 | Mostov |
| 2006/0207336 A1 | 9/2006 | Miyazaki |
| 2006/0243068 A1 | 11/2006 | Ueno et al. |
| 2006/0264221 A1 | 11/2006 | Koike et al. |
| 2007/0005200 A1 | 1/2007 | Wills et al. |
| 2007/0018083 A1 | 1/2007 | Kumar et al. |
| 2007/0062765 A1 | 3/2007 | Michel et al. |
| 2007/0076107 A1 | 4/2007 | Nishimura |
| 2007/0084676 A1 | 4/2007 | Vithani et al. |
| 2007/0095160 A1 | 5/2007 | Georgeson et al. |
| 2007/0096904 A1 | 5/2007 | Lockyer et al. |
| 2007/0151812 A1 | 7/2007 | Michel et al. |
| 2007/0152107 A1 | 7/2007 | LeFebvre et al. |
| 2007/0156307 A1 | 7/2007 | Muinonen et al. |
| 2007/0186642 A1 | 8/2007 | Sano et al. |
| 2007/0208841 A1 | 9/2007 | Barone |
| 2007/0241610 A1 | 10/2007 | Smith |
| 2007/0255509 A1 | 11/2007 | LeFebvre et al. |
| 2008/0064941 A1 | 3/2008 | Funderburk et al. |
| 2008/0097659 A1 | 4/2008 | Hawthorne |
| 2008/0179269 A1 | 7/2008 | Bachman |
| 2008/0195265 A1 | 8/2008 | Searle et al. |
| 2008/0252515 A1 | 10/2008 | Oestermeyer et al. |
| 2009/0001226 A1 | 1/2009 | Haygood |

(56) References Cited

U.S. PATENT DOCUMENTS

| | | |
|---|---|---|
| 2009/0001540 A1 | 1/2009 | Yang et al. |
| 2009/0010264 A1 | 1/2009 | Zhang |
| 2009/0015400 A1 | 1/2009 | Breed |
| 2009/0102649 A1 | 4/2009 | Diener et al. |
| 2009/0173840 A1 | 7/2009 | Brown et al. |
| 2009/0299550 A1 | 12/2009 | Baker |
| 2010/0032529 A1 | 2/2010 | Kiss et al. |
| 2010/0168941 A1 | 7/2010 | Geiger et al. |
| 2010/0200307 A1 | 8/2010 | Toms |
| 2010/0302974 A1 | 12/2010 | Niiyama et al. |
| 2011/0270475 A1 | 11/2011 | Brand et al. |
| 2011/0282540 A1 | 11/2011 | Armitage et al. |
| 2012/0037435 A1 | 2/2012 | Duehring |
| 2012/0046811 A1 | 2/2012 | Murphy et al. |
| 2012/0051643 A1 | 3/2012 | Ha et al. |
| 2012/0072266 A1 | 3/2012 | Schullian et al. |
| 2012/0166109 A1 | 6/2012 | Kernwein et al. |
| 2012/0303237 A1 | 11/2012 | Kumar et al. |
| 2013/0006451 A1 | 1/2013 | Cooper et al. |
| 2013/0116865 A1 | 5/2013 | Cooper et al. |
| 2013/0270396 A1 | 10/2013 | Agostini |
| 2013/0314239 A1 | 11/2013 | Clark et al. |
| 2013/0342362 A1 | 12/2013 | Martin |
| 2014/0060979 A1 | 3/2014 | Martin et al. |
| 2014/0089243 A1 | 3/2014 | Oppenheimer |
| 2014/0111356 A1 | 4/2014 | LeFebvre et al. |
| 2014/0244080 A1 | 8/2014 | Herden et al. |
| 2014/0372498 A1 | 12/2014 | Mian et al. |
| 2014/0375497 A1 | 12/2014 | Friend et al. |
| 2015/0060608 A1 | 3/2015 | Carlson et al. |
| 2015/0083869 A1 | 3/2015 | LeFebvre et al. |
| 2015/0148984 A1 | 5/2015 | Padulosi et al. |
| 2016/0027222 A1 | 1/2016 | Kurihara |
| 2016/0031849 A1 | 2/2016 | Yang et al. |
| 2016/0032576 A1 | 2/2016 | Leffler et al. |
| 2016/0272228 A1 | 9/2016 | LeFebvre et al. |
| 2016/0318497 A1 | 11/2016 | Wright et al. |
| 2016/0325767 A1 | 11/2016 | LeFebvre et al. |
| 2017/0021847 A1 | 1/2017 | Lefebvre et al. |
| 2017/0210401 A1 | 7/2017 | Mian |
| 2019/0225248 A1 | 7/2019 | Lidgett et al. |
| 2020/0007934 A1 | 1/2020 | Ortiz et al. |
| 2021/0053548 A1* | 2/2021 | Michel ............... B60T 13/665 |

FOREIGN PATENT DOCUMENTS

| | | |
|---|---|---|
| BR | 102013022303 | 8/2015 |
| CN | 1429726 A | 7/2003 |
| CN | 102238233 B | 11/2011 |
| EP | 1548419 A1 | 6/2005 |
| EP | 2 650 191 A1 | 10/2013 |
| EP | 2650191 A1 | 10/2013 |
| GB | 2295207 A | 5/1996 |
| JP | S63236937 A | 10/1988 |
| JP | 05213195 A | 8/1993 |
| JP | 05343294 | 12/1993 |
| JP | 08015099 | 1/1996 |
| JP | 10217968 | 8/1998 |
| JP | 11192948 | 7/1999 |
| JP | 2004294419 A | 10/2004 |
| JP | 2009210301 A | 9/2009 |
| WO | 01/015001 A2 | 1/2001 |
| WO | 2005105536 A1 | 10/2005 |
| WO | 2007076107 A2 | 7/2007 |
| WO | 2012088666 A1 | 7/2012 |
| WO | 2015/081278 A1 | 6/2015 |
| WO | 2015/100425 A1 | 7/2015 |
| WO | 2016/191711 A1 | 12/2016 |

OTHER PUBLICATIONS http://web.archive.org/web/20130206222004/http://lat-lon.com/gps-products/- locomotive-monitoring-unit,http://web.archive.org/web/20130206221020/http://lat-lon.com/gps-products- /solar-tracking-unit http://web.archive.org/web/20130205074831/http://lat-lon.com/gps-products- -sensors Available on the Internet at least as early as Feb. 6, 2013.

Topolev, V.P.; Automation of Strain-gauge Crane Scales; Feb. 1966; Translated from Izmeritel'naya Tekhnika, No. 2, pp. 81-82.

Balkov, P.P. et al.; Electrical Strain-gauge Scales; Oct. 1961; Translated from Izmeritel'naya Tekhnika, No. 10, pp. 17-20.

MSI-9300 Series User Guide, Rev Jul. 1, 27, 2002 for SW Ver 1-1.

Dillon EDxtreme Dynamometer and Crane Scale User's Manual, Dec. 2008 EDX.sub.—U.P65 PN 29808-0011 Issue AC.

Information Disclosure Statement for Salco Technologies, LLC Handbrake Sensor—Brochure dated Mar. 30, 2007.

Printout of web pages found at http://lat-lon.com/ Available on the Internet at least as early as Sep. 23, 2013.

Printout of web pages found at http://www.skybitz.com/ Available on the Internet at least as early as Sep. 23, 2013.

Printout of web pages found at http://www.transcore.com/ Available on the Internet at least as early as Sep. 23, 2013.

Printout of web pages found at http://www.id-systems.com/ Available on the Internet at least as early as Sep. 23, 2013.

Printout of web pages found at http://www.microstrain.com/wireless/ sensors Available on the Internet at least as early as Sep. 23, 2013.

International Search Report in related WO Application No. PCT/IB2013/03267, dated Apr. 23, 2015.

International Search Report and Written Opinion dated Oct. 1, 2019 issued in International Application No. PCT/US2019/014997.

European Search Report issued in European Patent Application No. 1957308 dated Sep. 8, 2021.

International Search Report and Written Opinion dated Feb. 24, 2022in International Application No. PCT/US2021/056508.

Extended European Search Report issued in European Patent Application No. 19833138.1 filed on Jan. 22, 2021.

U.S. Appl. No. 16/510,838, filed Jul. 12, 2019.

U.S. Appl. No. 62/697,054, filed Jul. 12, 2018.

* cited by examiner

Electronic Brake Test and Train Consist Reporting

| Events to report | Brake Pipe Pressure | Brake Force | Logic |
|---|---|---|---|
| Identify location of air leak during electronic brake test | >15 PSI delta | NA | If brake pipe is >15 PSI below pressure at first railcar (attached to loco), then identify railcar nearest loco with this condition and flag as source of air leak. |
| Identify any asset with brake issue during electronic brake test | 90 then 70 PSI | <500 and >2000 lbs | If brake pipe is charged to 90 PSI and brake force is <500 lbs, then brake release is sufficient. If brake pipe is reduced to 70 PSI and brake force is >2000 lbs, then brake set is sufficient. Else, flag for brake issue |
| Report railcars with low brake force | 90 then 70 PSI | >500 and <2000 lbs | If brake pipe is reduced from 90 to 70 PSI and brake force is >2000 lbs, then brake force is low. |
| Validate consist assets during electronic air brake test | 90 to 70 PSI | NA | If brake pipe is reduced from 90 to 70 PSI during a brake test, then that railcar is associated with that train under test |
| Validate consist order during electronic air brake test | 90 to 70 PSI | NA | During a brake test reduction from 90 to 70 PSI, timestamp the exact time of first pressure reduction. Order timestamps from each railcar to determine consist order |

FIG. 22A

Train Securement Audit and Hand Brake Damaging Events

| Events to report | Brake Pipe Pressure | Brake Force | Logic |
|---|---|---|---|
| Confirm hand brake applied for train securement | 90 PSI | >1000 lbs | If train is stopped and brake pipe pressure is 90 PSI and brake force changes from 0 to >1000 lbs, then handbrake is set |
| Identify "air over handbrake" application | <80 PSI | >1000 lbs | If train is stopped and brake pipe pressure changes from 90 to <80 PSI and then brake force changes from 0 to >1000 lbs, then handbrake is set over the air brake |
| Identify railcars moved with handbrakes applied | 90 PSI | >1000 lbs | If brake pipe pressure is 90 PSI and brake force is 1000 lbs, and then the train starts moving, then the railcar is moving with the handbrake applied |

FIG. 22B

Detecting Cause for Line of Road Failures

| Events to report | Brake Pipe Pressure | Brake Force | Logic |
|---|---|---|---|
| Identify location of break in train line during UDE brake application | >10 PSI delta | NA | During UDE brake application identify timestamp of 10 PSI decrease in under .35 seconds. Order timestamps from each railcar to determine location of break in train line |
| Identify source location of transient causing UDE | >10 PSI delta | NA | During UDE brake application identify timestamp of 10 PSI pressure transient in <0.35 seconds. Order timestamps from each railcar to determine location of transient |
| Identify asset responsible for UDE | <64 psi | NA | During UDE brake application identify timestamp of sustained pressure reduction below 64 PSI. Order timestamps from each railcar to determine emergency value responsible for UDE |

FIG. 22C

|  | Brake Monitoring Minimum (system 10a) | Brake Monitoring Basic (system 10b) | Brake Monitoring Advanced (system 10c) | Brake Monitoring Full / Complete (system 10d) |
|---|---|---|---|---|
| Before a train departs a rail yard | | | | |
| Ability to electronically test air brakes from a locomotive as an alternative process to the standard Class1 brake test as defined 49 CFR 232.205 - Class I brake test-initial terminal inspection. | | | X | X |
| Identify effective brakes across the train consist from the current electronic brake test and from previous trip data | X | X | X | X |
| Identify location of train line air leak for a targeted inspection, especially during cold weather operations. | X | X | X | X |
| Identify any railcar or locomotive with a brake issue so that an inspection can be conducted and a maintenance request can be automatically generated. | X | X | X | X |
| Confirm all hand brakes are released before train departs. | X | X | X | X |
| Confirm which railcars are in a train during an electronic air brake test to inform Railroad Dispatch of any discrepancies in the train manifest, such as out of route railcars. | | | X | X |
| Validate consist order to inform dispatch for operations. | | | X | X |

FIG. 23A

|  | Brake Monitoring Minimum (system 10a) | Brake Monitoring Basic (system 10b) | Brake Monitoring Advanced (system 10c) | Brake Monitoring Full / Complete (system 10d) |
|---|---|---|---|---|
| During line of road UDE brake application | | | | |
| Identify location of a break in train line for a targeted inspection and repair. | | | X | X |
| Identify the source location of a transient causing UDE so that an operation review can be conducted. | | | X | X |
| Identify the locomotive or railcar responsible for the UDE so that an inspection can be conducted and a maintenance request can be automatically generated. | | | X | X |

FIG. 23B

|  | Brake Monitoring Minimum (system 10a) | Brake Monitoring Basic (system 10b) | Brake Monitoring Advanced (system 10c) | Brake Monitoring Full / Complete (system 10d) |
|---|---|---|---|---|
| During train securement whether inside or outside a railyard. | | | | |
| Confirm the status of the air brakes on a train before the train operator leaves the train unattended. Report the status to the train operator and train dispatch. | | | X | X |
| Confirm the status of all the handbrakes on a train before the train operator leaves the train unattended. Report to the train operator and dispatch when the number of applied hand brakes exceeds the minimum required for the grade. Identify the track grade (slope) which the train is located and calculate the number of handbrakes needing secured for this grade. Confirm proper train securement using the status of the hand brakes on a railcar and count the number of hand brakes applies in the train consist. | | | X | X |
| For a safety and compliance audit, confirm the operating practices of securing a train with hand brakes. | | | X | X |

FIG. 23C

| | Brake Monitoring Minimum (system 10a) | Brake Monitoring Basic (system 10b) | Brake Monitoring Advanced (system 10c) | Brake Monitoring Full / Complete (system 10d) |
|---|---|---|---|---|
| During train operation | | | | |
| Ability to electronically test air brakes with an Automate Electronic Brake Test from a locomotive as an alternative process to the standard Class IA brake test as defined 49 CFR 232.205 - Class IA brake test-Intermediate brake inspection. Railroad estimate a savings of 30-90 minutes of operating time for every 1,000 mile intermediate brake stop by the elimination of a Class 1A brake test. | | x | x | x |
| Ability to electronically test with an Automate Electronic Brake Test for cold wheel railcars' (i.e., railcars having specific wheels that do not have the brake applied during travel when other railcars in the train do have brakes applied to their wheels, resulting in the offending wheels having lower temperature (or 'cold') wheels) from a locomotive during a braking event. | | x | x | x |

FIG. 23D

|  | Brake Monitoring Minimum (system 10a) | Brake Monitoring Basic (system 10b) | Brake Monitoring Advanced (system 10c) | Brake Monitoring Full / Complete (system 10d) |
|---|---|---|---|---|
| During train operation | | | | |
| After a UDE braking event, a location of a break in train line, such as air hose, or weakest brake valve must be determined so that an inspection can be conducted. | | | X | X |
| Confirm the train consist has effective brakes while the train is in operation | X | X | X | X |
| Identify railcars that were moved with the hand brakes applied so that wheel damage can be correlated to the incorrect hand brake application. Such identification can be used to educate responsible parties and prevent future damage, or to bill responsible parties for damages. | | | X | X |
| Identify "air over handbrake" application so that wheel damage can be correlated to incorrect hand brake application. | | | X | X |

FIG. 23D
CONTINUED

| | Brake Monitoring Minimum (system 10a) | Brake Monitoring Basic (system 10b) | Brake Monitoring Advanced (system 10c) | Brake Monitoring Full / Complete (system 10d) |
|---|---|---|---|---|
| During train operation | | | | |
| Identify railcars exhibiting low brake force so that a maintenance request can be automatically generated for the next available railcar maintenance opportunity | X | X | X | X |
| After a UDE braking event, identify the location of a break in train line, such as air hose or weakest brake valve, must determined so that an inspection of the offending railcar can be conducted. | | | X | X |
| After a UDE braking event, it is necessary to identify the railcar or locomotive responsible for the UDE so that an inspection of the offending railcar can be conducted and a maintenance request can be automatically generated. | | | X | X |
| Supply report of railcars exhibiting low brake force so that a maintenance request can be automatically generated and to target necessary inspections and maintenance of wheels and to bill responsible parties for damages. | X | X | X | X |

FIG. 23D
CONTINUED

|  | Brake Monitoring Minimum (system 10a) | Brake Monitoring Basic (system 10b) | Brake Monitoring Advanced (system 10c) | Brake Monitoring Full / Complete (system 10d) |
|---|---|---|---|---|
| During maintenance activity | | | | |
| Report railcars that have properly operating brakes in order to reduce unnecessary scheduled brake tests (SCABT) | X | X | X | X |
| Supply report of railcars that have improper operating brakes in order to target necessary tests and maintenance. | X | X | X | X |
| Supply report of railcars that do not have effective operating brakes in order to target necessary tests and maintenance. | X | X | X | X |
| Identify which specific part of the brake system had a malfunction for targeted repair. | | | | X |
| Supply report of railcars moved with the hand brakes applied in order to target necessary inspections and maintenance of wheels and to bill responsible parties for damages. | | | X | X |
| Supply report of railcars with "air over handbrake" application in order to target necessary inspections and maintenance of wheels and to bill responsible parties for damages. | | | X | X |
| Supply report of railcars exhibiting low brake force so that a maintenance request can be automatically generated and to target necessary inspections and maintenance of wheels and to bill responsible parties for damages. | X | X | X | X |

FIG. 23E

BRAKE MONITORING SYSTEMS FOR RAILCARS

CROSS REFERENCE TO RELATED APPLICATIONS

This application is a continuation of U.S. patent application Ser. No. 16/510,838 (now U.S. Pat. No. 11,312,350) filed on Jul. 12, 2019, which claims the benefit of priority to U.S. Provisional Patent Application No. 62/697,054 filed Jul. 12, 2018, the disclosures of which are hereby incorporated by reference in their entireties.

Train/Rail communication and sensor systems are disclosed in U.S. Pat. No. 7,688,218 issued Mar. 30, 2010; U.S. Pat. No. 7,698,962 issued Apr. 20, 2010; U.S. Pat. No. 9,981,673 issued May 29, 2018; U.S. Pat. No. 8,212,685 issued Jul. 3, 2012; U.S. Pat. No. 8,823,537 issued Sep. 2, 2014; U.S. Pat. No. 9,026,281 issued May 5, 2015; U.S. Pat. No. 9,365,223 issued Jun. 14, 2016; U.S. Pat. No. 9,663,092 issued May 30, 2017; U.S. Pat. No. 9,663,124 issued May 30 2017; U.S. Pat. No. 10,137,915 issued Nov. 27, 2018; U.S. Pat. No. 10,259,477 issued Apr. 16, 2019; and U.S. patent application publication 2018/0319414, published Nov. 8, 2018; U.S. patent application Ser. No. 10,259,477 issued Apr. 16, 2019; U.S. patent application publication 2016/0325767 filed Jun. 24, 2016; and U.S. Pat. No. 10,137,915 issued May 27, 2016, the full disclosures of which are incorporated herein by reference.

FIELD OF THE INVENTION

This disclosure relates generally to the operation and safety management of trains. In one aspect, the disclosure is directed to methods for continuously collecting and analyzing operational parameters of railcar brake systems. In another aspect, the disclosure is directed to self-diagnostic railcar brake systems with the potential to improve the operating efficiency and safety of trains. The systems can monitor the status of a brake system; and can provide brake-health messages and alerts, and other status indications, when the railcar in is motion or is stationary. It is believed that the systems and methods disclosed herein can lead to improvements in the operating methods, security, and safety of trains, locomotives, and railcars.

BACKGROUND

The functionality of railcar brake systems and their individual components currently is monitored through a combination of manual tests and inspections. The tests and inspections typically are performed at pre-determined time intervals; during regular scheduled maintenance; prior to a departure from the rail yard; during intermediate stops; prior to leaving the train unattended; and at other times. While vitally important to safe operation, the various brake systems tests and inspections can significantly reduce the efficiency of railroad operations, and can require a substantial expenditure of manpower.

For example, federal regulations require that single car air brake tests (SCABTs) be performed on individual railcars under certain circumstances, such as the discovery of wheel defects, after replacement of certain brake-system components, at predetermined time intervals, etc. Because SCABTs do not have a high degree of reliability, and the majority of such tests do not find identify anything wrong with the railcar, substantial amounts of time and money are wasted looking for brake issues on individual railcars.

As another example of railcar brake testing, railroad operators may spend up to three hours preparing a train for departure. The preparation process includes a Class 1A brake test-initial terminal inspection. This particular test is labor-intensive, and requires leak testing, actuation of the brakes, and other time-consuming manual procedures.

As a further example of required brake testing, during trips longer than 1,000 miles, a train consist needs to stop so that a Class 1A intermediate brake test can be performed on each of its railcars. The need to interrupt the travel of the train consist to perform this testing can significantly reduce the operating efficiency of the railroad.

Railroad operators need to secure trains, railcars, and locomotives to prevent unattended or other unintended movement, which can create a dangerous situation within a railyard or rail network. For example, unintended movement can occur when the air in the brake line of a train is depleted, which can result in a reduction in the retarding force holding the train.

Unattended railcars typically are secured through the use of manually-actuated hand brakes, such as those described in U.S. Pat. Nos. 9,026,281 B2, 9,488,252 B2, and 9,663,092 B2, the disclosures of which are incorporated herein by reference. Due to the dangers of unattended movement, it is desirable to obtain confirmation, before the operator leaves the train consist unattended, that the railcars have been secured from movement by the application of their respective hand brakes. It is also desirable to obtain confirmation, before the train consist begins moving, that the hand brakes on each railcar have been released. If hand brakes are not released before a railcar begins moving, a damaging event, such as wheel flats, can occur.

An undesired emergency (UDE) brake application occurs when air pressure contained within the air brake system of a train consist is quickly released, causing the railcars within the consist to rapidly apply their brakes. Railroad operators desire to reduce the occurrence of UDE brake applications in order to improve the reliability and efficiency of the railroad network. Reducing UDE brake applications requires identification of when, and why UDE brake applications have occurred, so that repairs and other corrective actions can be undertaken.

Railroads also desire to validate the railcars and locomotives of train consists before leaving the railyard. This can entail obtaining a count of the assets in the train consist, and the order of the locomotives and railcars in the consist.

In view of the above, it is desirable to provide railroad operators with the following capabilities relating to the monitoring and testing of railcar braking systems, and alerting railroad operations centers and locomotive operators, i.e., the train engineers, of actual and potential maintenance issues and other problems with the braking systems.

Before a Train Departs a Rail Yard

Electronically test the railcar brake from the locomotive, as an alternative process to the standard Class 1 brake test as defined 49 CFR 232.205-Class I brake test-initial terminal inspection.

Identify effective brakes across the train consist from the current electronic brake test and from previous trip data Identify the location of train line air leaks for a targeted inspection, especially during cold weather operations.

Identify any railcar with an actual or potential brake issue and automatically generate a maintenance request so that an inspection can be conducted.

Confirm that the hand brakes of all railcars are released before departure.

Validate the consist of locomotive(s) and railcars during electronic air brake testing to inform railroad dispatch of any discrepancies in the train manifest, such as out of route railcars.

During Line of Road UDE Brake Application

Identify the location of a break in train line so that a targeted inspection can be performed.

Identify the source locations of transient events causing UDE brake applications, so that an operations review can be conducted.

Identify the locomotive or railcar responsible for the UDE brake application and automatically generate a maintenance request so that an inspection can be conducted.

During Train Securement, Whether Inside or Outside a Railyard

Confirm the status of the air brakes and hand brakes on a train before the train operator leaves the train unattended. Report to the train operator and dispatch when the total number of applied hand brakes exceeds the minimum required for the grade.

For a safety and compliance audit, confirm the operating practices of securing a train with hand brakes.

Identify the track grade (slope) which the train is located and calculate the number of hand brakes needing secured for this grade. Confirm proper train securement using the status information for the hand brakes on the railcars, and count the overall number of hand brakes applied in the train consist.

For safety and compliance audits, confirm that the required operating practices of securing a train with hand brakes were followed.

During Train Operation

Electronically test air brakes, from a locomotive, with an automated electronic brake test as an alternative process to the standard Class 1A brake test as defined 49 CFR 232.205-Class 1A brake test-intermediate brake inspection. Railroads estimate a savings of 30-90 minutes of operating time for every 1,000 mile intermediate brake stop that does not have to occur due to the elimination of a Class 1A brake test.

Electronically test, with an automated electronic brake test, for 'cold wheel railcars, i.e., railcars having wheels that do not receive braking pressure during travel, resulting in lower temperature (or "cold") wheels, from a locomotive during a braking event.

Confirm that the train consist has effective brakes while the train is in operation.

Identify railcars that were moved with the hand brakes applied so that wheel damage can be correlated to the incorrect hand brake application. This information can be used to educate responsible parties and prevent future damage, or to bill responsible parties for any resulting damage.

Identify instances of "air over hand brake" application so that wheel damage can be correlated to erroneous hand brake application.

Supply report of railcars exhibiting low brake force so that a maintenance request can be automatically generated for the next available railcar maintenance opportunity.

After a UDE braking event, identify the location of a break in train line, such as an air hose, or the weakest brake valve, so that an inspection can be conducted.

After a UDE braking event, it is necessary to identify the railcar or locomotive responsible for the UDE braking event so that an inspection can be conducted and a maintenance request can be automatically generated.

During Scheduled Maintenance of the Railcars

Supply report of railcars that have properly operating brakes in order to reduce unnecessary scheduled brake tests (SCABTs)

Supply report of railcars that have improperly-operating brakes, to target necessary tests and maintenance.

Supply report of railcars that do not have effectively-operating brakes, to target necessary tests and maintenance.

Identify, for targeted repair, which part of the brake system malfunctioned.

Supply report of railcars that were moved with the hand brake applied to target necessary inspections and maintenance of the affected wheels, and to bill the responsible parties for damages.

Supply report of instances of "air over hand brake" application so that wheel damage can be correlated to erroneous hand brake application.

Supply report of railcars exhibiting low brake force so that a maintenance request can be automatically generated; to target necessary inspections and maintenance of wheels; and to bill the responsible parties for damages.

Applicant currently is unaware of any reliable system for remotely monitoring the status of brake systems on trains. Accordingly, it is desirable to provide systems and methods for the real-time or near real-time, on-board monitoring of various operational parameters of train, locomotive, and railcar brake systems, and for analyzing the readings in real time, or near real time to predict or timely detect anomalous operational conditions and to issue appropriate alerts regarding such conditions.

SUMMARY

The systems and methods disclosed herein are intended to address deficiencies in prior art monitoring systems for the brake systems for trains, railcars, and locomotives. The systems include hierarchical arrangements of components that provide a distributed data analysis capability for detecting operational anomalies at various levels of the hierarchy, and provide for the flow of data, events notifications, and alerts to a central point.

In one form, the invention provides a system for detecting the operational status of a brake system on a railcar. The system includes a sensor located on the railcar and configured to generate an output indicative of a magnitude of a braking force applied by the braking system. The system further includes a computing device communicatively coupled to the sensor and which includes a computer-readable storage medium comprising one or more programming instructions. When executed, the instructions cause the computing device to: receive from the sensor an indication of the magnitude of a braking force applied by the braking system in response to an instruction to increase or decrease the braking force; compare the response to possible responses of the braking system to the instruction to increase or decrease the braking force; and based on the comparison, generate at least one of a message and an alert indicating the status of the brake system. This can further include one or more additional sensors located on the railcar and configured to generate outputs indicative of any of the following: the magnitude of a pressure in a brake pipe of the railcar, which pressure controls the application of the railcar brake pneumatically, and a sensor for the status of a hand brake on the railcar.

In another form, the invention provides a method of detecting the status of a brake system on a railcar that includes a railcar brake. The method includes: (a) changing the pressure in a brake pipe of a railcar, which controls the application of the railcar brake, by an amount sufficient to do one of the following desired actions: actuate and release the railcar brake; (b) sensing the force applied to the railcar brake in response to step (a); and (c) determining, based on the force sensed in step (b), if the desired action was obtained. If it is determined in step (c) that the desired action was not obtained, communicating a notification to a remote receiver. Other systems and methods are provided.

In another form, at the lowest level of the hierarchy, each railcar is equipped with one or more wireless sensor nodes, referred to in the singular as a "WSN." The WSNs on a particular railcar are arranged in a network controlled by a communication management unit ("CMU"), which usually is located on the same railcar. This type of network is referred to herein as a "railcar-based network." The WSNs collect data regarding various operational parameters of their associated railcar, and are capable of detecting certain anomalies based on the collected data. When anomalous operational data is detected, an alert can be raised and the data can be communicated to the associated CMU located on the railcar. Although mesh networks are used in the embodiments illustrated herein, other types of network topologies can be used in the alternative.

The CMUs located on each railcar also are arranged in a network which is controlled by a powered wireless gateway ("PWG") typically located in the locomotive. This type of network is referred to herein as a "train-based network." Although mesh networks are used in the embodiments illustrated herein, other types of network topologies can be used in the alternative.

The train-based network communicates over the length of the train consist, and can deliver information about the railcars equipped with a CMU to a powered host or control point. The host or control point can be a locomotive of the train consist; or another asset with access to a power source, and having the ability to communicate with a remote railroad operations center.

BRIEF DESCRIPTION OF THE DRAWINGS

The following drawings are illustrative of particular embodiments of the present disclosure and do not limit the scope of the present disclosure. The drawings are not to scale and are intended for use in conjunction with the explanations in the following detailed description. Various non-limiting embodiments will be described in detail with reference to the drawings, wherein like reference numerals represent like parts and assemblies throughout the several views.

FIGS. 22A-22C are tables denoting logical operations that can be performed in connection with electronic brake testing and train consist reporting by the brake monitoring systems shown in FIGS. 3-11.

FIGS. 23A-23E are tables denoting various diagnostic, alerting, and reporting capabilities of the brake monitoring systems shown in FIGS. 3-11.

DETAILED DESCRIPTION

Figure 1:
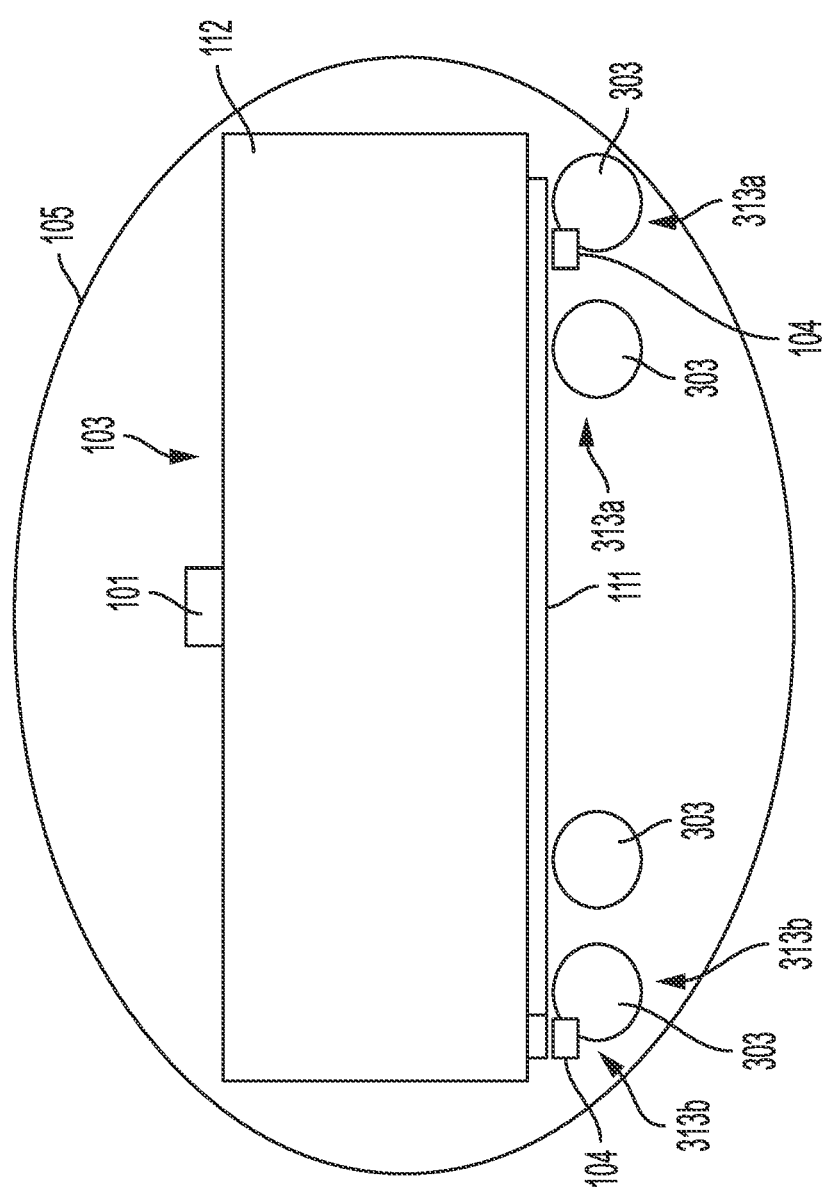
FIG. 1 is a schematic illustration of a railcar equipped with a brake monitoring system comprising a communications management unit ("CMU") and a plurality of wireless sensor nodes (WSNs) that form a railcar-based network in accordance with an aspect of this disclosure.

The term "railcar," as used herein, means a single railcar; or two or more railcars 103 which are permanently connected, often referred to by those of skill in the art as a "tandem pair", "three-pack", "five-pack", etc. The terms "train consist" or "consist," as used herein, mean a connected group of railcars and one or more locomotives. A train consist 109 is depicted schematically in FIG. 2. The train consist 109 is made up of a locomotive 108, and a plurality of the railcars 103. This particular configuration of the train consist 109 is depicted for illustrative purposes only. The systems and methods disclosed herein can be applied to train consists having a different number of locomotives 108 and railcars 103 than the train consist 109.

Brake Monitoring System

The figures depict a brake monitoring system 10, and variants thereof. The system 10 is described in connection with the railcars 103, a description of which is provided below. Each railcar 103 has a braking system 100, a description of which also is provided below. The system 10 includes a combination of sensors and signal processing equipment that allow the system 10 to sense various operating parameters of the braking system 100; to process and analyze data relating to the operating parameters; to make logical decisions and inferences regarding the condition of the brake system 100, and generate alerts and other status information based thereon; to form networks within each railcar 103, and throughout the train consist 109; and to communicate information regarding the status of brake system 100 to sources within, and external to the train consist 109.

As discussed below, the specific configuration of the brake monitoring system 10 for a particular application is selected based on the diagnostic, alerting, and reporting requirements imposed on the system 10, which in turn are dependent upon the requirements of the user. Typically, the capabilities of the system 10 are tailored to specific user requirements by varying the number, locations, and types of sensors used within the system 10. This concept is discussed below, where alternative embodiments of system 10, having capabilities different than, or in addition to, those of the system 10, are described.

Figure 2:
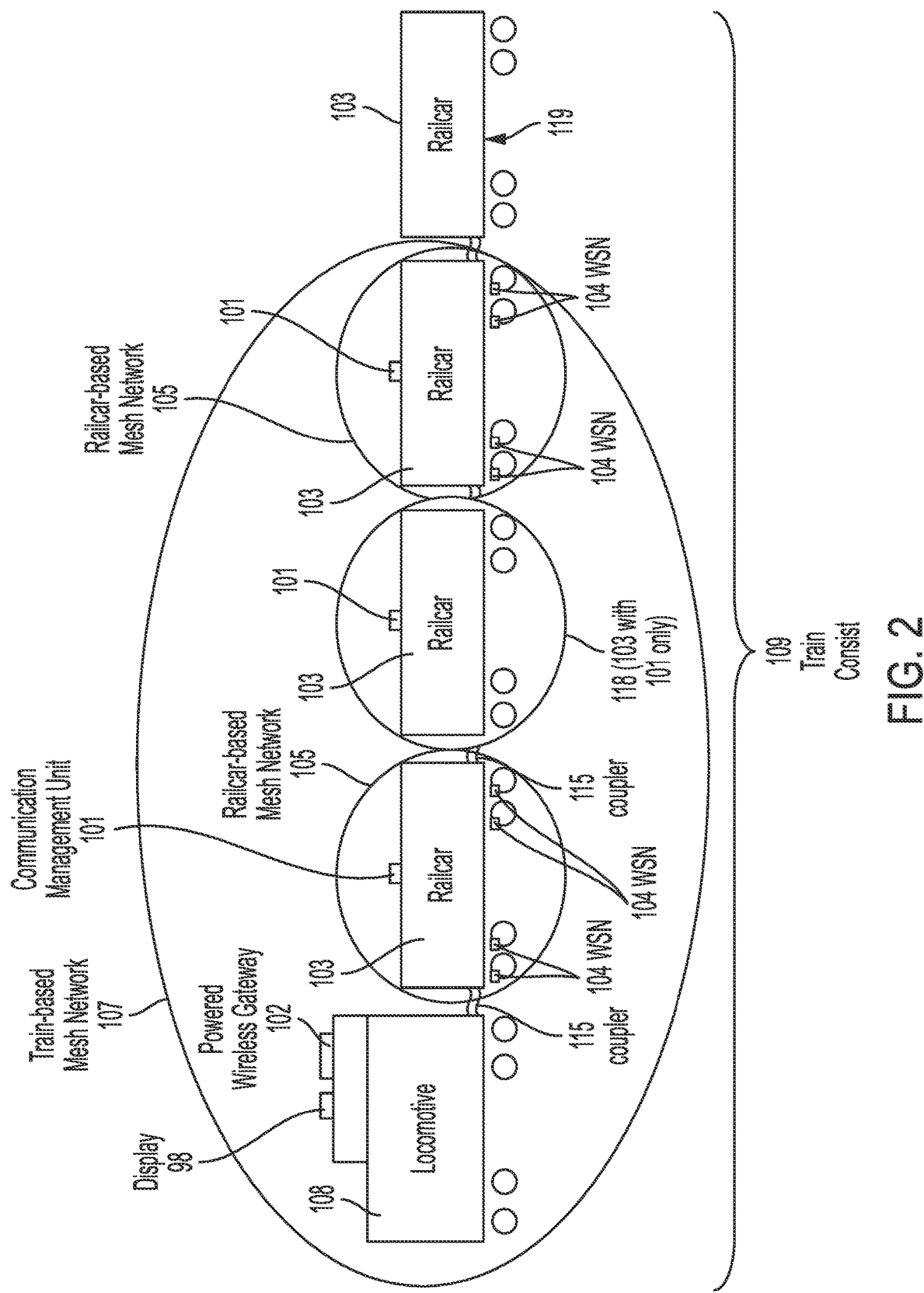
FIG. 2 is a schematic illustration of a train-based network in accordance with another aspect of this disclosure, showing railcars equipped with different combinations of CMUs and WSNs; and showing a powered wireless gateway (PWG) device installed on a locomotive, wherein the PWG, CMUs, and WSNs form the train-based network.
Figure 3:
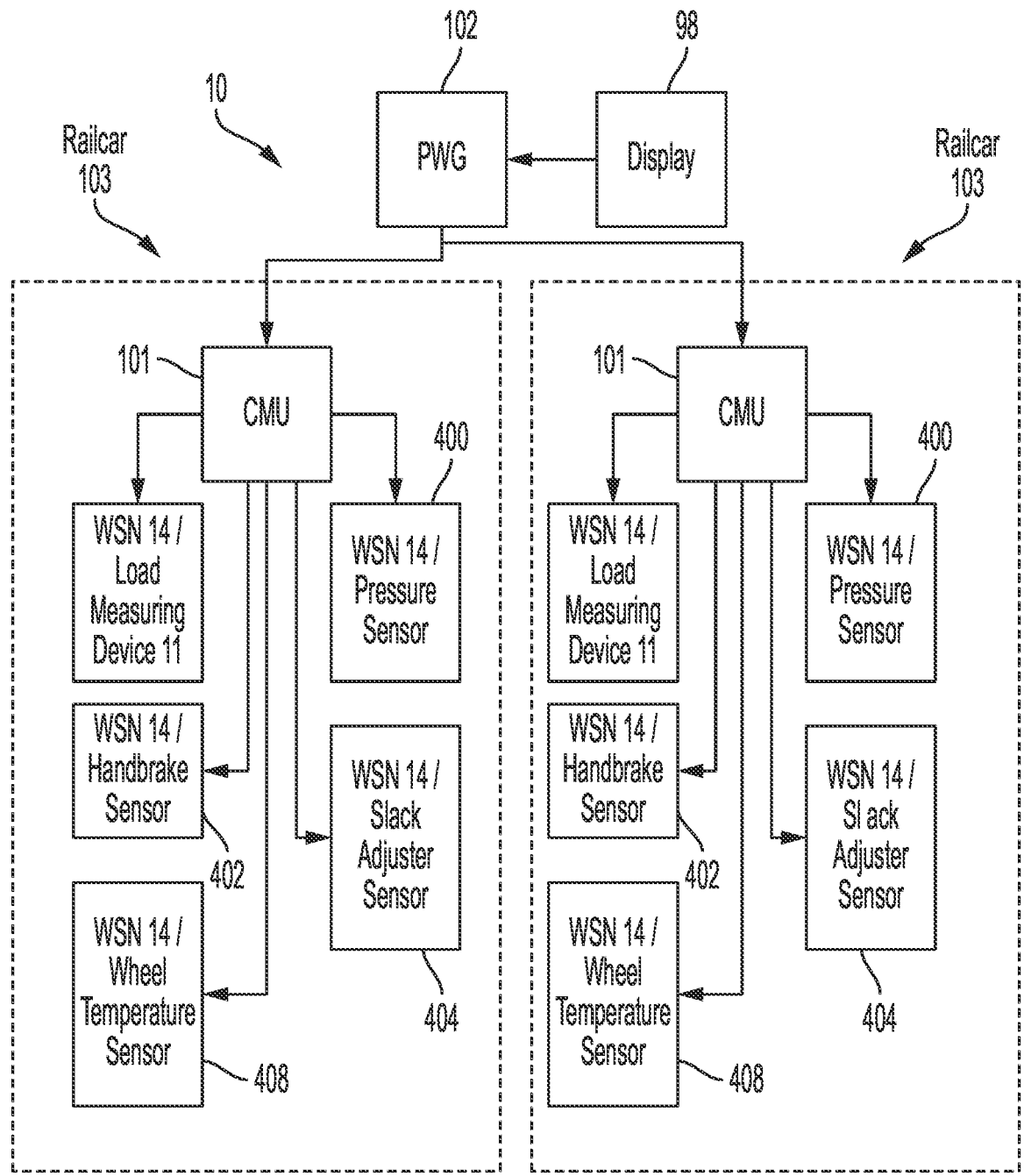
FIG. 3 is a diagrammatic illustration of a brake monitoring system that incorporates the PWG, CMUs, and WSNs of the networks shown in FIGS. 1 and 2, in accordance with another aspect of this disclosure.

The system 10 includes one or more communication management units ("CMUs") 101, depicted in FIGS. 1-3. Each CMU 101 is located on a respective railcar 103, and when one or more WSNs 14 are installed on the railcar 103, the CMU 101 manages a railcar-based network 105 overlaid on that particular railcar 103.

The system 10 also includes wireless sensor nodes (WSNs) 104, also depicted in FIGS. 1-3. One or more of the WSNs 104 are mounted on each network-enabled railcar 103, and form part of the railcar-based network 105 associated with that railcar 103. The WSNs 104 communicate with, and are controlled by their associated CMU 101, which typically is the CMU 101 installed on the same railcar 103 as the WSNs 104. The WSNs 104 on the railcar 103 and their associated CMU 101 form the railcar-based network 105 for that particular railcar 103.

The system 10 further includes a powered wireless gateway ("PWG") 102. The PWG 102 is located on the locomotive 108. Alternatively, the PWG 102 can be positioned at other locations on the train consist 109, preferably where a source of external power is available or in a railyard. The PWG 102 manages a train-based network 107 overlaid on the train consist 109, and communicates directly with each of the CMUs 101 on the various railcars 103 in the train consist 109. The PWG 101, the CMUs 101, and WSNs 104 make up the train-based network 107.

Each CMU 101 can comprise a processor; a power source such as a battery, energy harvester, or internal power-generating capability; a global navigation satellite system (GNSS) device such as a global positioning system ("GPS") receiver, Wi-Fi, satellite, and/or cellular capability; a wireless communications capability for maintaining the railcar-based network 105; a wireless communication capability for communicating with the train-based network 107; and optionally, one or more sensors, including, but not limited to, an accelerometer, gyroscope, proximity sensor or temperature sensor. Although GPS is used in the embodiments described herein, any type of GNSS system or devices can be used in alternative embodiments. For example, GLONASS and BeiDou can be used in lieu of GPS; and other types of GNSS are in development.

The CMU 101 communicates with the WSNs 104 within its associated railcar-based network 105 using open standard protocols, such as the IEEE 2.4 GHz 802.15.4, Bluetooth LE, or Bluetooth Mesh radio standards. As noted above, the CMU 101 also forms part of the train-based network 107, which includes all of the CMUs 101 in the train consist 109; and the PWG 102, which controls the CMUs 101.

Each CMU 101 performs the following functions: managing the low-power railcar-based network 105 overlaid on its associated railcar 103; consolidating data from one or more WSNs 104 in the network 105 and applying logic to the data to generate messages and warning alerts to a host such as the locomotive 108 or a remote railroad operations center; supporting built-in sensors, such as an accelerometer, within the CMU 101 to monitor specific attributes of the railcar 103 such as location, speed, and accelerations, and to provide an analysis of this information to generate alerts; and supporting bi-directional communications upstream to the host or control point, such as the locomotive 108 and/or an off-train, remote railroad operations center; and downstream to its associated WSNs 104 on the railcar 103.

The CMUs 101 can communicate with the PWG 102 on a wireless basis. Alternatively, the CMUs 101 can be configured to communicate through a wired connection, such as through the electronically controlled pneumatic (ECP) brake system of the train consist 109.

Each CMU 101 is capable of receiving data and/or alarms from its associated WSNs 104; drawing inferences from the data or alarms regarding the performance of the railcar 103 and its braking system 100; and transmitting the data and alarm information to the PWG 102 or other remote receiver. The CMU 101 can be a single unit. In addition to communicating with, controlling, and monitoring the WSNs 104 in the local railcar-based network 105, the CMU 101 has the capability of processing the data it receives from the WSN's 104. The CMU 101 also serves as a communications link to other locations, such as the PWG 102. The CMUs 101 optionally can be configured with off-train communication capabilities similar to those of the PWG 102, to allow the CMUs 101 to communicate with devices off of the train consist 109, such as a server located at a remote railroad operations center.

The PWG 102 controls the train-based network 107 overlaid on the train consist 109. The PWG 102 can include a processor; a GPS or other type of GNSS device; one or more sensors, including but not limited to an accelerometer, a gyroscope, a proximity sensor, and a temperature sensor; a satellite and or cellular communication system; a local wireless transceiver, e.g. WiFi; an Ethernet port; a high capacity network manager; and other means of communication. The PWG 102 can receive electrical power from a powered asset in the train consist 109, such as the locomotive 108. Alternatively, or in addition, the PWG 102 can receive power from another source, such as a solar-power generator or a high-capacity battery. Also, the PWG 102 can be configured to perform the logical operations The components and configuration of the PWG 102 are similar to those of the CMUs 101, with the exception that the PWG 102 typically draws power from an external source, while the CMUs 101 typically are powered internally. Also, the PWG 102 collects data and draws inferences regarding the overall performance of the train consist 109 and the train-based network 107. The CMUs 101, by contrast, collect data and draw inferences regarding the performance of individual railcars 103 and their associated railcar-based network 105.

Also, the PWG 102 is a computing device that includes a processor; and a computer-readable storage medium comprising one or more programming instructions that, when executed by the processor, cause the PWG 102 to perform the various logical functions associated with the brake monitoring system 10 and described below. Alternatively, these logical functions can be performed by another computing device, such as a specially modified CMU 101 or WSN 104; or by a central server located at a remote location such as a railroad operations center.

Each WSN 104 collects data via its associated sensors. The sensors can be located internally within the WSN 104. Alternatively, the sensors can be located external to the WSN 104, and can communicate with the WSN 104 by cabling or other suitable means, including wireless means. The WSN 104 can process and analyze the data to determine whether the data needs to be transmitted immediately; held for later transmission; and/or aggregated into an event or alert. The WSNs 104 and their associated sensors can be used to sense a monitored parameter, e.g., gate open or close events, brake force, etc.; or to determine the status of a parameter, e.g., the position of a gate lever. Examples of WSNs 104 are disclosed in U.S. Pat. No. 9,365,223, the entire contents of which hereby are incorporated by reference herein.

The WSNs 104 can be equipped, or otherwise associated with virtually any type of sensor, depending on the particular parameter or parameters that the WSN 104 will be used to monitor or determine. For example, the WSNs 104 can be equipped or associated with one or more of: a proximity sensor; a temperature sensor; a pressure sensor; a load cell; a strain gauge; a hall effect sensor; a vibration sensor; an accelerometer; a gyroscope; a displacement sensor; an inductive sensor; a piezo resistive microphone; and an ultrasonic sensor. In addition, the sensor can be a type of switch, including, for example, reed switches and limit switches. A hand-brake monitor sensor is described in U.S. Pat. Nos. 9,026,281 and 9,663,092, the entire contents of which are incorporated herein by reference; this sensor is an example of a type of remote sensor that uses a strain gauge and can be incorporated into a WSN 104.

The specific configuration of each WSN 104 varies with respect to the number, and types of sensors with which the WSN 104 is equipped or otherwise associated. The sensing capabilities of the WSN's 104 installed on a particular railcar 103 are dependent upon the specific configuration of the brake monitoring system 10, which in turn is dependent, in part, on the diagnostic, alerting, and reporting requirements imposed on the system 10 by the user in a particular application.

Each WSN 104 includes the electrical circuitry necessary for the operation of the WSN 104. The electrical circuitry includes the components and wiring needed to operate the particular sensors associated with the WSN 104, and/or to receive and process the output signals generated by the sensors. This circuitry can include, but is not limited to: analog and digital circuitry; CPUs; processors; circuit boards; memory; firmware; and controllers.

The circuitry of the WSN 104 can include a main board that accommodates communications circuitry; antennae; a microprocessor; and a daughter board that includes circuitry to read the data from sensors. The main board, daughter board, and/or the sensors also can include a processor that executes firmware to provide intelligence sufficient to perform low-level analysis of the data; and can accept parameters from outside sources regarding when alarms should be raised.

Each WSN 104 also includes circuitry for short-range wireless communications; and a long-term power source such as a battery, an energy harvester, or internal power-generating capability. In the exemplary embodiments of the WSNs 104 disclosed herein, the power source is a military grade lithium-thionyl chloride battery. The circuitry also provides power conditioning and management functions, including features that conserve battery life by, for example, maintaining the WSN 104 in a standby state and periodically waking the WSN 104 to deliver readings from its sensors. The WSNs 104 optionally can be configured with off-train communication capabilities similar to those of the PWG 102, to allow the WSNs 104 to communicate with devices off of the train consist 109, such as a server located at a remote railroad operations center.

Railcar

The railcar 103 is, as a non-limiting example, a box car. The railcar 103 can be configured as follows. This description of the railcar 103 is provided solely as an illustrative example of a railcar with which the brake monitoring system 10 can be used. The brake monitoring system 10 can be used in railcars having other configurations, including railcars in the form of hopper cars; flatcars; gondolas; coal cars; tank cars; etc.

As illustrated in FIG. 1, the railcar 103 comprises an underframe 311; a box 312 mounted on the underframe 311; and a first and a second truck 313*a*, 313*b* each coupled the underframe 311. The first truck 313*a* is located proximate a first end of the railcar 103; and the second truck 313*b* is located proximate a second end of the railcar 103. Each truck 313*a*, 313*b* can rotate in relation to the underframe 311 about a vertically-oriented central axis of the truck 313*a*, 313*b*, to facilitate transit of the railcar 103 over curved sections of track.

Figure 12:
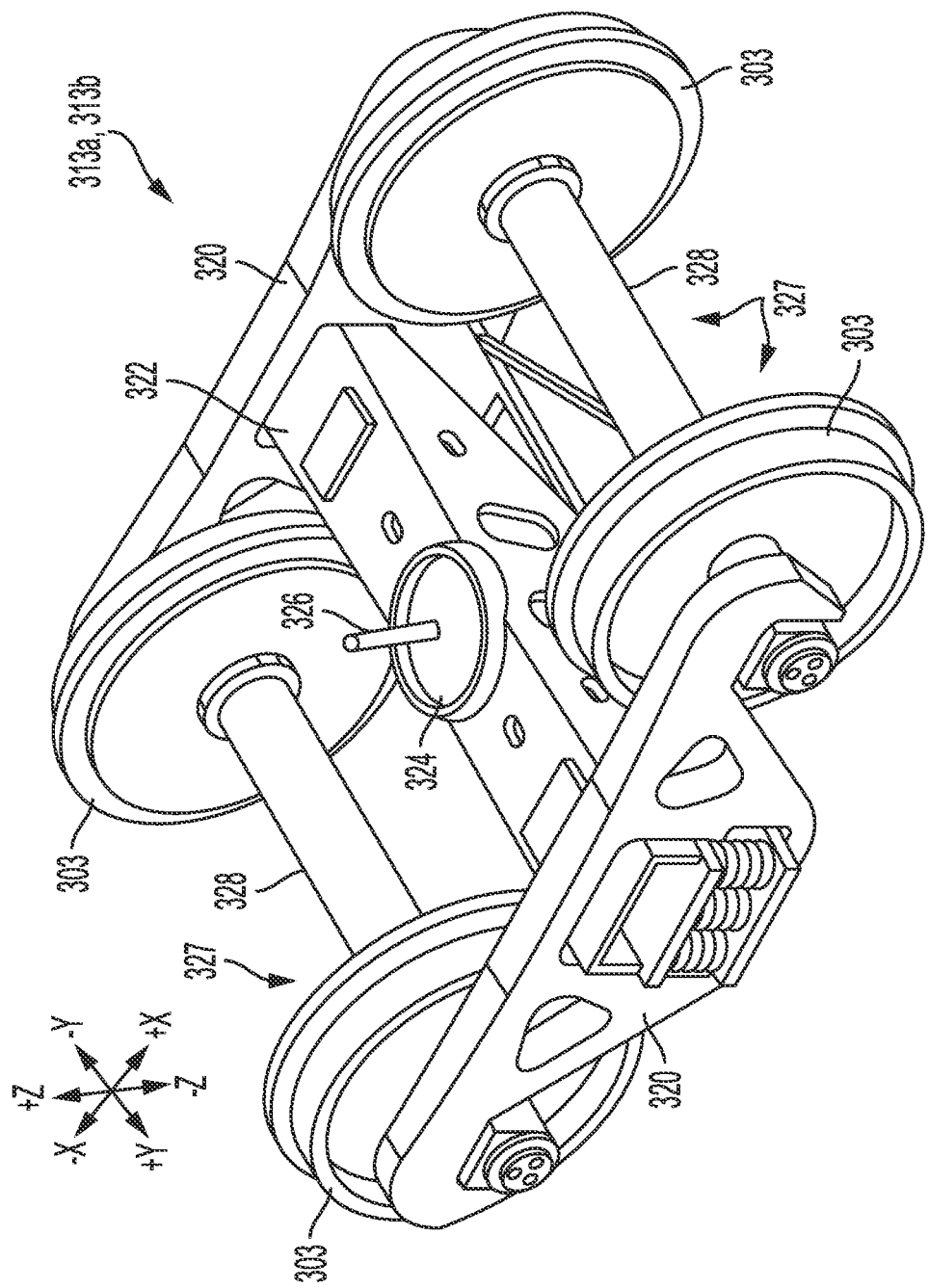
FIG. 12 is a perspective view of a truck of the railcar shown in FIG. 1.

Referring to FIG. 12, each truck 313*a*, 313*b* includes two side frames 320; a bolster 322 located between and connected to the side frames 320; a center plate 324 mounted on the bolster 322; and a center pin 326 secured to the bolster 322 and extending through the center plate 324. Each truck 313*a*, 313*b* is coupled to the underframe 311 of the railcar 103 by way of the center pin 326, and rotates in relation to the underframe 311 about the center pin 326. The underframe 311 and the box 312 are supported on the trucks 313*a*, 313*b* by way of the center plates 324, each of which engages, and rotates in relation to a center sill on the underframe 311.

Each of the trucks 313*a*, 313*b* also includes two wheel assemblies 327. The wheel assemblies 327 each include an axle 328, and two of the wheels 303 mounted on opposite ends of the axle 328. The axles 328 are coupled to, and rotate in relation to the side frames 320 by way of journal bearings (not shown).

Brake System

The brake system 100 can be configured as follows. This description of the brake system 100 is provided solely as an illustrative example of a brake system into which the brake monitoring system 10 can be incorporated. The brake monitoring system 10 can be incorporated into brake systems having other configurations. For example, the brake system 100 uses foundation brake rigging. As shown in FIGS. 8-11, the brake monitoring system 10, and variants thereof, can be incorporated into a brake system 100a that uses truck mounted brake rigging.

Figure 4:
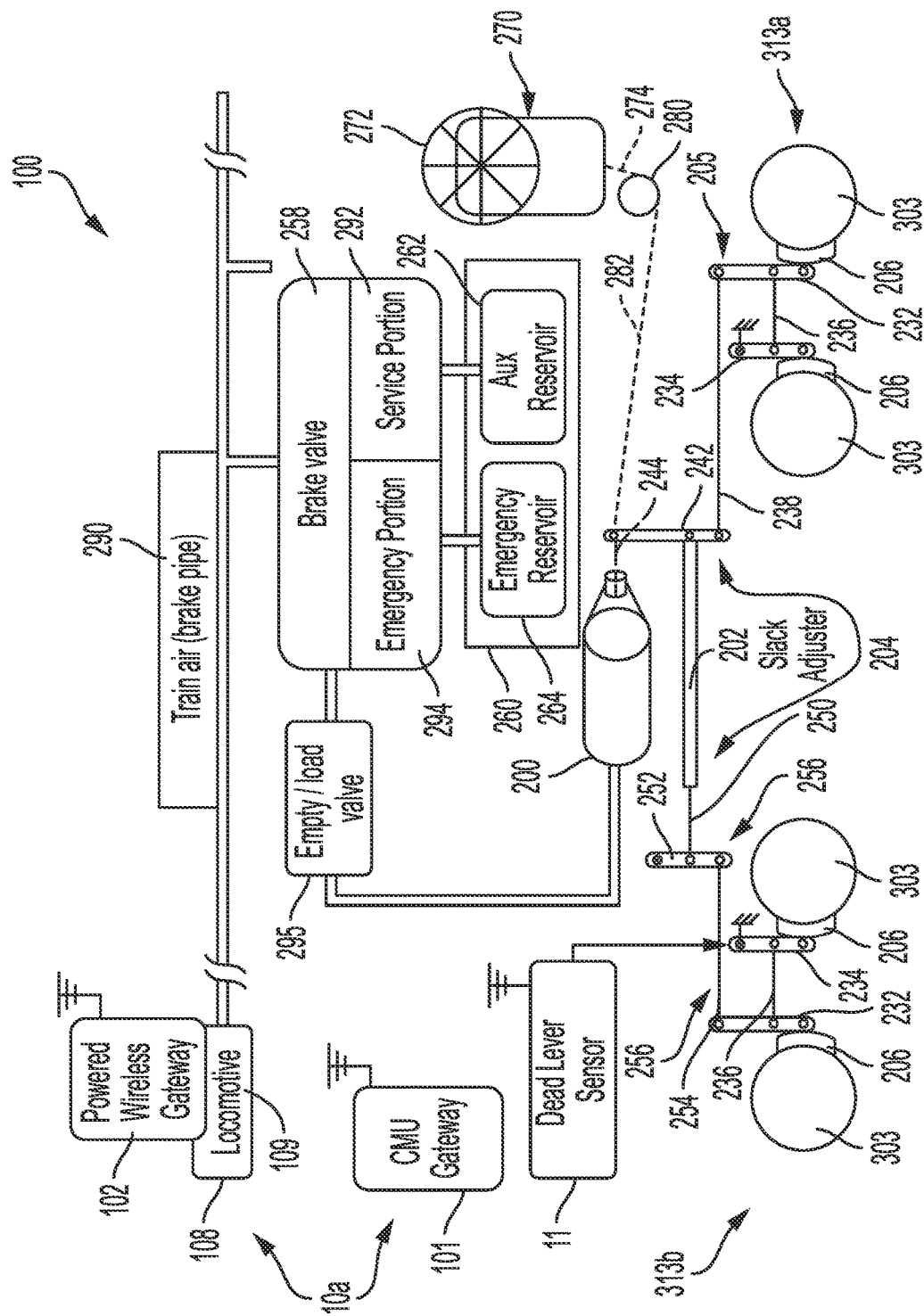
FIG. 4 is a schematic illustration of a train air brake system having foundation brake rigging, and incorporating a variant of the brake monitoring system shown in FIG. 3.
Figure 13A:
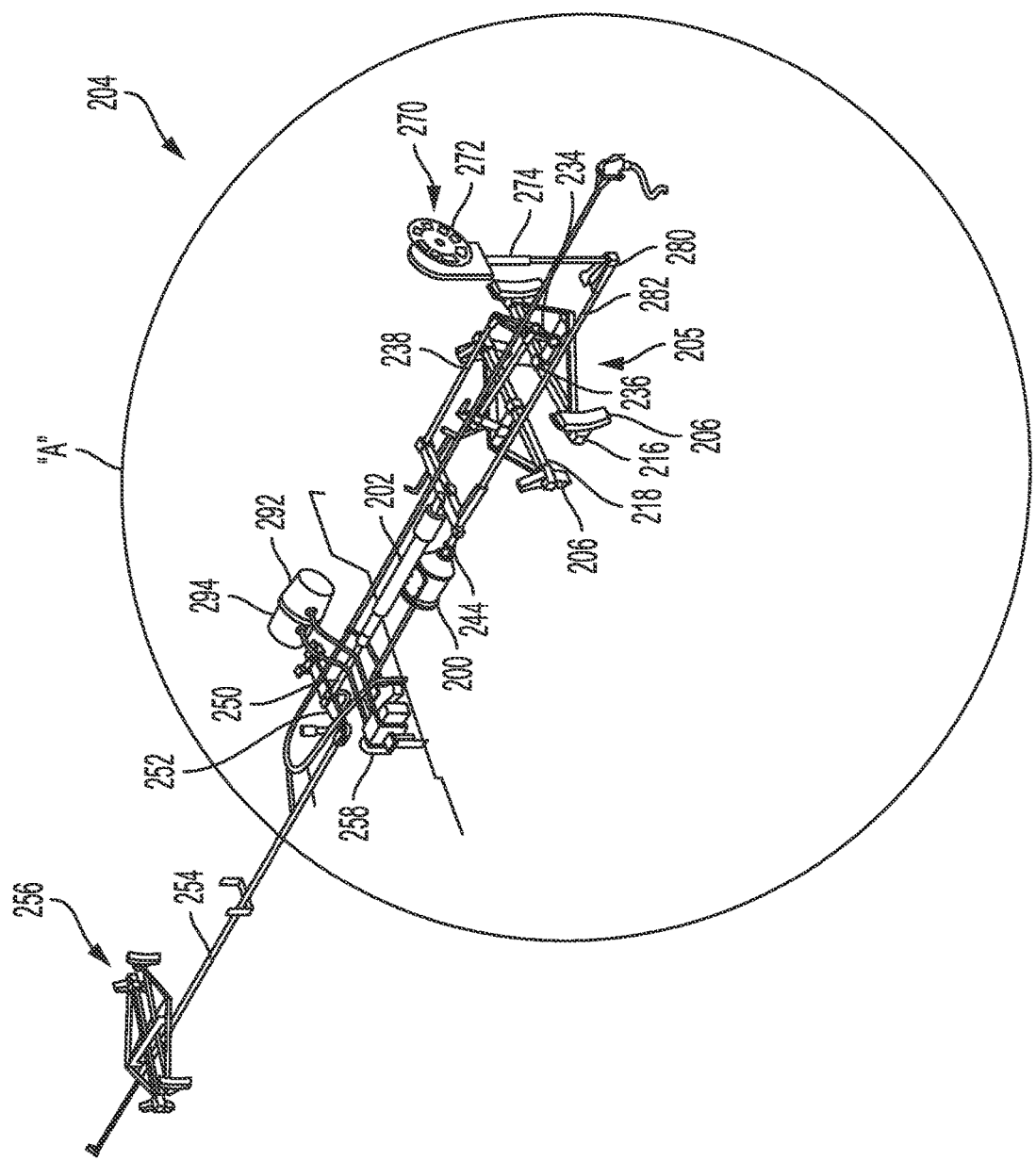
FIG. 13A is a perspective view of rigging of the train air brake system shown in FIGS. 4-7.
Figure 13B:
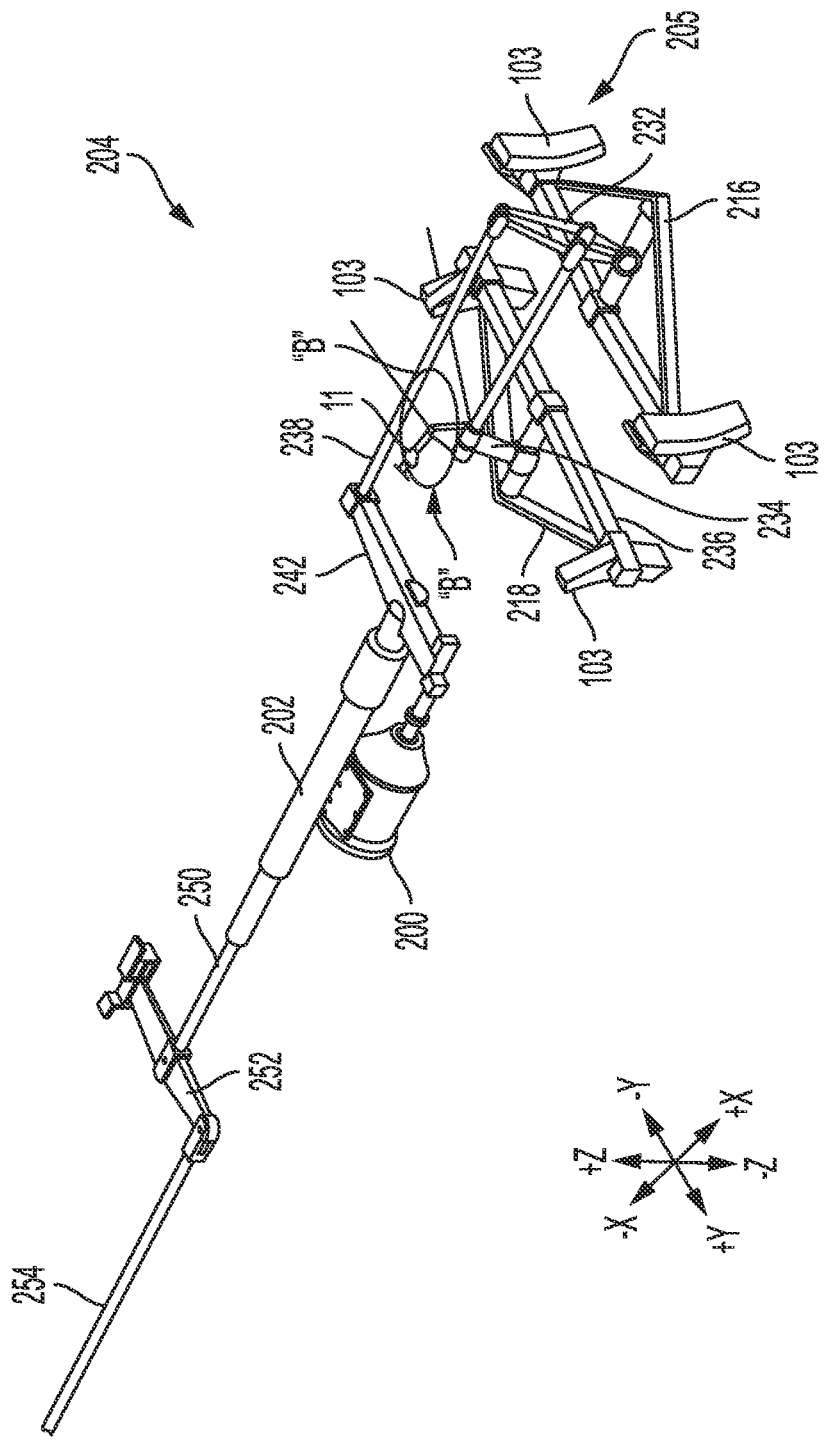
FIG. 13B is a magnified view of the area designated "A" in FIG. 13A (FIGS. 13A-13B are collectively referred to as "FIG. 13").

Referring to FIGS. 4, 13A, and 13B, the brake system 100 includes a pneumatic brake cylinder 201, a slack adjuster 202, the rigging 204, and eight brake shoes 206. Each brake shoe 206 is connected to the rigging 204; and each brake shoe 206 is positioned proximate to a respective one of the wheels 303. The rigging 204 articulates in a manner that urges each brake shoe 206 into and out of contact with an outer tread of its associated wheel 303. Contact between the brake shoe 206 and the wheel 303 results in friction that produces a braking force on the wheel 303. The force that operates the rigging 204 is supplied by an air brake system that includes the brake cylinder 201. As discussed below, the air brake system is an automated system that facilitates simultaneous braking of all the railcars 103 of the train consist 109 from a single location, to slow and stop the entire train consist 109.

The rigging 204 incudes a first rigging subassembly 205, visible in detail in FIG. 13B. The subassembly 205 is associated with the first truck 313a, and includes a first brake beam 216 and a second brake beam 218. Two of the brake shoes 206 are mounted near the respective ends of the first brake beam 216; another two of the brake shoes 206 are mounted near the respective ends of the second brake beam 218.

Each end of the first brake beam 216 is positioned in, and supported by a bracket (not shown) mounted on the respective one of the side frames 320, proximate a forward end of the side frame 320. Each end of the second brake beam 218 likewise is positioned in, and supported by a bracket mounted on the respective one of the side frames 320, proximate a rearward end of the side frame 320. The forward and rearward directions are denoted in the figures as the "+x" and "−x" directions, respectively. The brackets are configured to restrain the first and second brake beams 216, 218 in the vertical and lateral directions, while allowing a limited degree of sliding movement in relation to the side frames 320 in the forward and rearward directions.

Referring to FIG. 13B, the first rigging subassembly 205 also includes a first truck lever 232; a second truck lever 234; a truck lever connection 236; and a top rod 238. A lower end of the first truck lever 232 is pivotally coupled to the first brake beam 216; an upper end of the first truck lever 232 is pivotally coupled to a forward end of the top rod 238. A forward end of the truck lever connection 236 is pivotally coupled to the first truck lever 232, at the approximate mid-point of the first truck lever 232.

Figure 21:
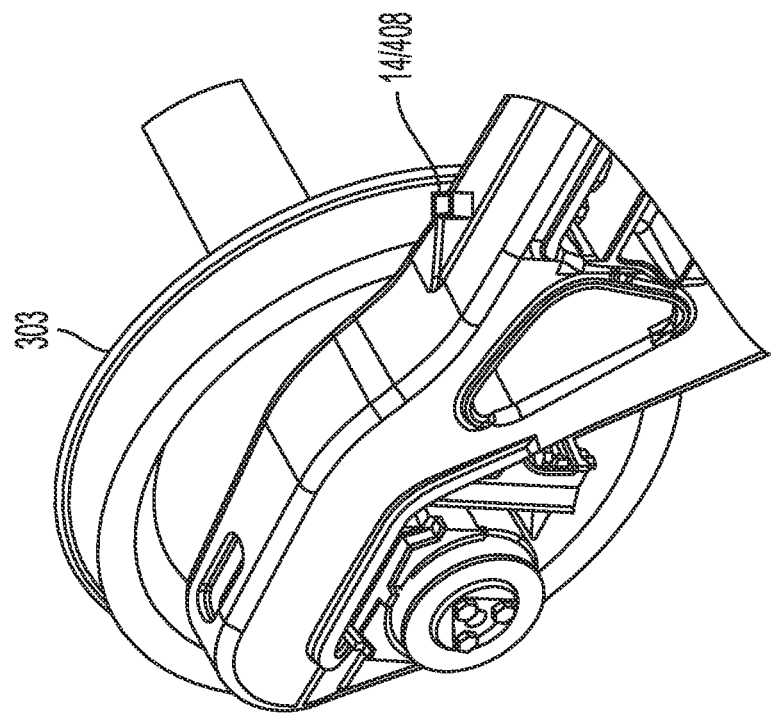
FIG. 21 is a perspective view of the wheel temperature sensor shown in FIG. 28.

A lower end of the second truck lever 234 is pivotally coupled to the second brake beam 218; and an upper end of the second truck lever 234 is pivotally coupled to a forward end of a first load measuring device 11, as shown in FIG. 21. A rearward end of truck lever connection 236 is pivotally coupled to the second truck lever 234, at the approximate mid-point of the second truck lever 234.

A rearward end of the first load measuring device 11 is pivotally coupled to a bracket 240, as shown in FIG. 21. The first load measuring device 11 is described below. The bracket 240 is secured to the underframe 311 of the railcar 103. The bracket 240 thus acts as an anchoring point for the rigging 204, i.e., the bracket 240 connects the articulating rigging 204 to the non-articulating underframe 311. Because the load measuring device 11 is connected directly to the bracket 240, a portion of the reactive force exerted by the underframe 311 in response to the braking force exerted on the wheels 303 of the first truck 313a by the rigging 204 and the brake shoes 326 is transmitted through the load measuring device 11. Thus, the load measuring device 11 is subject to a mechanical load that is indicative of, and proportional to the braking force applied to the wheels 303 of the first truck 313a.

Referring to FIGS. 4, 13A, and 13B, the first rigging subassembly 205 also includes a brake lever 242. A first end of the brake lever 242 is pivotally coupled to a rearward end of the top rod 238. A second end of the brake lever 242 is pivotally coupled to a push rod 244 of the brake cylinder 201. The brake cylinder 201 is securely mounted on the underframe 311, and thereby acts as another anchoring point for the rigging 204. A forward end of the slack adjuster 202 is pivotally coupled to the brake lever 242, proximate a mid-point of the brake lever 242.

The rigging 204 also includes a center rod 250, a fulcrumed lever 252, and a second top rod 254. A forward end of the center rod 250 is pivotally coupled to a rearward end of the slack adjuster 202. A rearward end of the center rod 250 is pivotally coupled to the fulcrumed lever 252, at the approximate mid-point of the fulcrumed lever 252. A first end of the fulcrumed lever 252 is pivotally coupled to the underframe 311, and thus serves as an additional anchoring point for the rigging 204. A second end of the fulcrumed lever 252 is pivotally coupled to a forward end of the second top rod 254. The rearward end of the second top rod 254 is pivotally coupled to a first truck lever 232 of a second rigging subassembly 256.

The second rigging subassembly 256 is depicted in FIGS. 4 and 13A. The second rigging subassembly 256 is substantially identical to the first rigging subassembly 205, and identical reference characters are used in the figures to refer to identical components of the first and second rigging subassemblies 205, 256. The second rigging subassembly 256, and the four brake shoes 206 associated therewith, apply braking force to the wheels 303 of the second truck 313b of the railcar 103. The second load measuring device 11 is associated with the second rigging subassembly 256, and is mounted between a second truck lever 234 of the second rigging subassembly 256; and another bracket 240 secured to a second location on the underframe 311. Thus, the second load measuring device 11 is subject to a mechanical load that is indicative of, and proportional to the braking force applied to the wheels 303 of the second truck 313b. The second load measuring device 11 is substantially identical to the first load measuring device 11.

Referring to FIG. 4, the brake system 100 further includes a brake valve 258, and a dual-compartment air reservoir 260. The air reservoir 260 includes a service reservoir 262 and an emergency reservoir 264. The brake cylinder 201 is pneumatically actuated, and receives pressurized air from the brake valve 258. The brake valve 258 directs pressurized air from the air reservoir 260 to the brake cylinder 201. The pressured air, upon entering the brake cylinder 201, acts against a piston (not shown) within the brake cylinder 201, causing the piston to move forward against the bias of an internal spring (also not shown). The piston is connected to the push rod 244 of the brake cylinder 201, so that movement of the piston imparts a corresponding movement to the push rod 244.

The rigging 204 is actuated by the brake cylinder 201. In particular, the forward movement of the push rod 244 in response to the pressurization of the brake cylinder 201 causes the brake lever 242, which is pivotally coupled to the push rod 244, to rotate about the point at which the brake lever 242 is coupled to the slack adjuster 202. The rotation is in a clockwise direction, from the perspective of FIG. 4. The rotation of the brake lever 242 pulls the attached top rod 238 rearward, which in turn causes the top of the first truck lever 232 to move rearward.

The rearward movement of the first truck lever 232 causes the first truck lever 232 to rotate in a counterclockwise direction from the perspective of FIG. 4, about the point at which the truck lever connection 236 is coupled to the first truck lever 232. The rearward movement of the first truck lever 232 also causes the truck lever connection 236 to move rearward, which in turn causes the second truck lever 234 to rotate in a clockwise direction, about the point at which the second truck lever 234 is coupled to the clevis 234. The rotation of the first and second truck levers 232, 234 causes the first and second beams 216, 218 to move forward and rearward, respectively, in relation to the side frames 320. The movement of the first and second beams 216, 218 urges the brake shoes 206 on each of the first and second beams 216, 218 into contact with their associated wheels 303, resulting in the application of a braking force to the wheels 303 of the first truck 313a.

The rotation of the brake lever 242 in response to movement of the push rod 244 also causes the slack adjuster 202 to move rearward, which imparts a corresponding rearward movement to the center rod 250. The rearward movement of the center rod 250, in turn, causes the fulcrumed lever 252 to rotate in a clockwise direction from the perspective of FIG. 16, about the point at which the fulcrumed lever 252 is coupled to the underframe 311. The rotation of the fulcrumed lever 252 imparts a rearward movement to the second top rod 254, which in turn actuates the second rigging subassembly 256 in a manner substantially identical to the above-described actuation of the first rigging subassembly 205. The actuation of the second rigging subassembly 256 results in the application of a braking force to the wheels 303 of the second truck 313b.

The braking force applied by the first and second rigging subassemblies 205, 256 is removed by releasing the air pressure within the brake cylinder 201, which in turn causes the push rod 244 to move rearward under the bias of the internal spring of the brake cylinder 201. The rearward movement of the push rod 244 causes the various components of the first and second rigging subassemblies 205, 256 to articulate in a manner opposite to that described above in relation to the application of braking force, resulting in movement of the brake shoes 206 away from their associated wheels 303.

The brake system 100 also includes a manually operated hand brake 270, depicted in FIG. 4. The hand brake 270 includes a handle assembly mounted on the forward or rearward end of the box 312. The handle assembly includes a hand wheel 272, an axle (not shown), and gearing (also not shown) that mechanically couples the hand wheel 272 and the axle. The gearing provides a mechanical advantage that facilitates manual rotation of the hand wheel 272 by a single operator.

The hand brake 270 also includes a first chain 274 having a first end connected to the axle; a bell crank 280 connected to a second end of the first chain 274; and a second chain 282 having a first end connected to the bell crank 280, and a second end connected to the second end of the brake lever 242.

Rotation of the hand wheel 272 in a first direction imparts rotation to the axle, which in turn causes a portion of the first chain 274 to be wound around the axle, and the second end of the first chain 274 to move generally upward, from the perspective of FIG. 4. The upward movement of the first chain 274 rotates the bell crank 280. The rotation of the bell crank 280 causes the second chain 282 to move generally to the right, from the perspective of FIG. 4, which in turn causes the brake lever 242 to rotate in a clockwise direction. The clockwise rotation of the brake lever 242 results in actuation of the rigging 204 in the above-described manner, which in turn results in the application of braking force to the wheels 303. Subsequent rotation of the hand wheel 272 in a direction opposite the first direction causes the various components of the rigging 204 to return to their original positions in response to the bias of the internal spring of the brake cylinder 201, thereby removing the braking force from the wheels 303.

The brake valve 258 directs pressurized air to the brake cylinder 201 to actuate the rigging 204. The brake valve 258 facilitates charging, i.e., pressurization, of the air reservoir 260; the release of air pressure from the air reservoir 260; and maintenance of the air pressure within the air reservoir 260. Pressurized air is produced by a compressor (not shown) located in the locomotive 105. The pressurized air is directed from the compressor to the brake valve 258 by a train air line, or brake pipe 290. The brake pipe 290 also services the other railcars 103 in the train 104, and thus extends over substantially the entire length of the train consist 109. The portion of the brake pipe 290 associated with each railcar 103 connects to the brake-pipe portions of the railcars 103 in front of, and to the rear of that particular railcar 103.

The brake valve 258 has a service portion 292 and an emergency portion 294. The engineer can apply normal braking force by moving a brake handle in the locomotive 108 to a "service" position. This results in a gradual, controlled reduction in the air pressure within the brake pipe 290. For example, air pressure may be gradually reduced from about 90 psi to about 26 psi during the application of normal braking force. The service portion 292 of the brake valve 258, in response to this reduction in pressure, closes a valve 295 located in the airflow path between the brake valve 258 and the brake cylinder 201, and directs air from the service reservoir 262 into the brake cylinder 201. This causes the pressure within the brake cylinder 201 to increase, which in turn causes the piston and the attached push rod 244 to move forward. The forward movement of the push rod 244, as discussed above, causes the rigging 204 to articulate in a manner that results in the application of braking force to the wheels 303.

The air pressure in the service reservoir 262 decreases until the air pressure in the service reservoir 262 approximately equals that in the brake pipe 290. At this point, the service portion 292 of the brake valve 258 once again isolates the brake cylinder 201 from the brake pipe 290. Barring any significant leaks in the brake cylinder 201, the pressure within the brake cylinder 201 thereafter remains at a substantially constant level; and the brake shoes 206 remain in contact with their associated wheels 303, resulting in the continued application of braking force to the wheels 303.

The brake system 100 can include an empty/load valve 295 that identifies whether the railcar 103 is empty or loaded, based on the compression of the springs on the trucks 313a, 313b of the railcar 103. The amount of air supplied to the brake cylinder 201 during braking operations is modified based on an empty or loaded condition. Because a loaded railcar 103 requires more braking pressure than an empty railcar 103, the brake pressure is reduced to a minimum value by the empty/load valve if the railcar 103 is empty; and is increased to a maximum value when the railcar 103 is at or near its maximum operating weight.

The engine operator releases the braking force by moving the brake handle to a "release" position. This results in an increase in the pressure within the brake pipe 290, which in turn causes the service portion 292 of the brake valve 258 to open the valve 295. Opening the valve 295 causes the pressurized air within the brake cylinder 201 to be discharged to the atmosphere, which causes the piston and the attached push rod 244 to move rearward under the bias of the internal spring of the brake cylinder 201. As discussed above, the rearward movement of the push rod 244 causes the rigging 204 to articulate in a manner that moves the brake shoes 206 away from their associated wheels 303, thereby removing the braking force on the wheels 303.

Also, the positive pressure differential between the brake pipe 290 and the service reservoir 262 causes the service portion 292 of the brake valve 258 to direct pressurized air from the brake pipe 290 to the service reservoir 262, causing the air pressure in the service reservoir 262 to increase. When the pressures in the brake pipe 290 and the service reservoir 262 equalize, the brake valve 258 interrupts the flow of pressurized air between the brake pipe 290 and the auxiliary reservoir 262, isolating the service reservoir 262 and sealing the pressurized air within the service reservoir 262. The service reservoir 262 at this point is ready to provide air the brake cylinder 201 when braking force is subsequently requested by the engine operator.

The emergency portion 294 of the brake valve 200 operates in a manner similar to the service portion 292, with the exception that the emergency portion 294 causes a faster and more forceful application of braking force. Emergency braking can be initiated manually by the train operator, by pulling an emergency braking handle, which causes an immediate discharge of the air pressure with the brake pipe 290; or automatically in the event of a significant leak in brake pipe 290 or other event that results in a rapid loss of air pressure within the brake pipe 290. The emergency portion 294 is configured to respond to a rapid drop in air pressure within the brake pipe 290 by closing the valve 295 and simultaneously directing air from both the emergency reservoir 264 and the service reservoir 262 to the brake cylinder 201, resulting in a rapid application of full braking force.

Sensors

As noted above, the capabilities of the system 10 can be tailored to the requirements of a particular application through the number, locations, and types of sensors incorporated into the system. The following types of sensors can be incorporated into the system 10, and alternative embodiments thereof. These sensors are described for illustrative purposes only; other types of sensors, configured to measure the same, or different parameters than those noted below, can be used in alternative embodiments of the system 10.

Hand Brake Sensor

Figure 14:
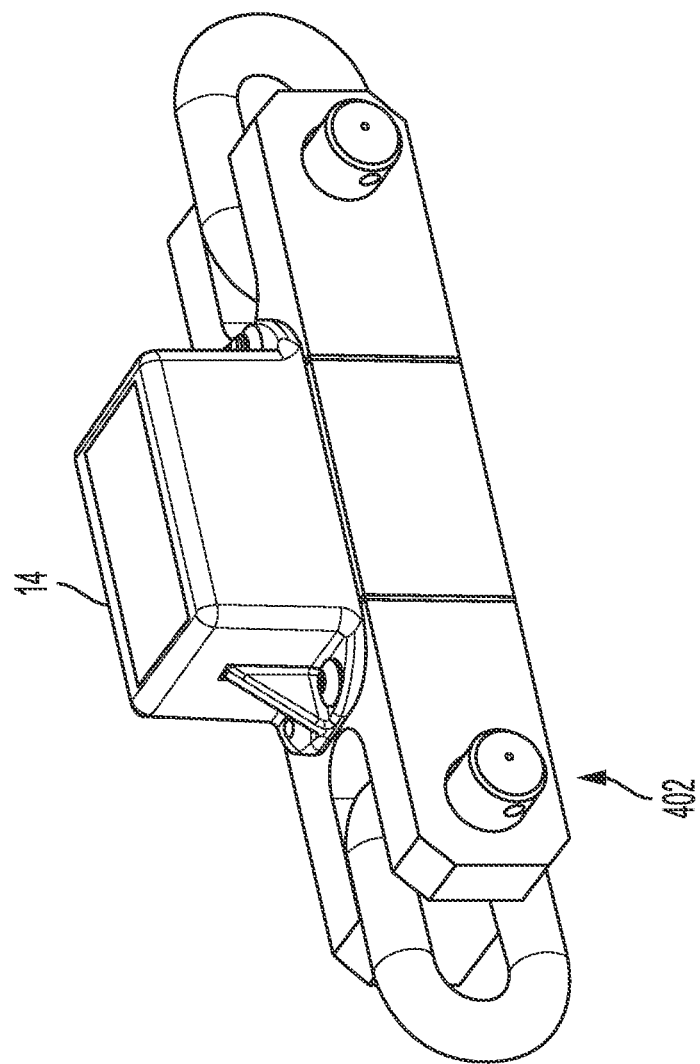
FIG. 14 is a perspective view of a hand brake sensor that can be used in variants of the brake monitoring system shown in FIG. 3.
Figure 15:
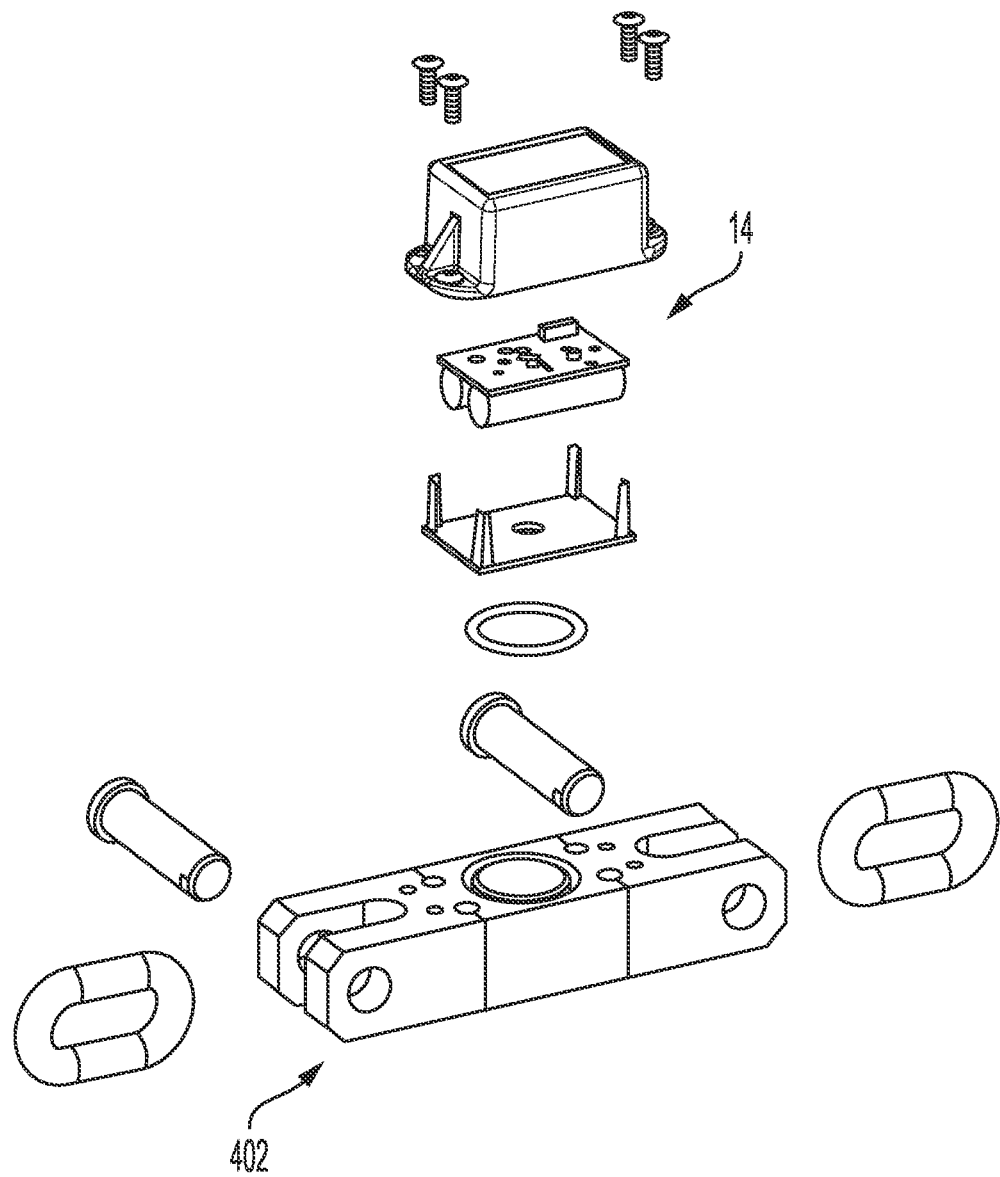
FIG. 15 is an exploded view of the hand brake sensor shown in FIG. 22.

FIGS. 14 and 15 depict a hand brake sensor 402 that can be incorporated into the system 10 and variants thereof. The sensor 402 can be used to monitor the tension applied by the hand brake 270. The sensor 402 is communicatively coupled to a WSN 104. The WSN 104 is configured to interface with the sensor 402, and in addition, contains the general functionality of WSNs 14 described above.

The hand brake sensor 402 can be incorporated into the second chain 282 of the hand brake 270. The sensor 402 uses a strain gauge to determine the force being applied to the hand brake 270. The hand brake sensor 402 can be configured as disclosed in U.S. Pat. No. 9,734,565, the entire contents of which are incorporated by reference herein. The readings from the hand brake sensor 402 are sent by the WSN 104 to the associated CMU 101, which forwards the readings to the PWG 102 or other computing device for further analysis, reporting, and alerting. The sampling rate of the sensor 402 can be set, and changed by the CMU 101 based on the operational state of the railcar 103.

Load Measuring Devices for Determining Brake Force

The first and second load measuring devices 11 are identical; and unless otherwise noted, references to a single load-measuring device 11 apply equally to both of the first and second load measuring devices 11. As discussed above and as shown in FIGS. 4-11, 13A, and 13B, each load-measuring device 11 is mounted between, and mechanically connects the articulating rigging 204 of the brake system 100 with the non-articulating underframe 311 of the railcar 103. This arrangement subjects the load measuring devices 11 to a mechanical load whenever the brake system 100 applies braking force to the wheels 303 of the railcar 103, whether through the brake cylinder 200 or the hand brake 270. The load measuring device 11 generates an electrical signal representative of the mechanical load on the load measuring device 11, thereby providing an indication of whether the brake system 100 is generating a braking force on the railcar 103, and allowing the magnitude of the braking force to be determined. The first and second load measuring devices 11 can be mounted at locations other than those described above, in alternative embodiments of the system 10. In particular, the first and second load measuring devices 11 can be mounted anywhere within the brake rigging 204 downstream of the brake lever 242. As an example, the devices 11 can be inserted between rods of the rigging such that the load passes through it.

Force sensors in the form of the above-described hand bake sensor 402 can be used as the load measuring devices 11. Other types of force sensors can be used as the load measuring devices 11 in alternative embodiments. Each load measuring device 11 is communicatively coupled to an associated WSN 104. The WSN 104 determines the mechanical load on its associated load measuring device 11 based on the output of the load measuring device 11. The WSN 104 sends this information to an associated CMU 101 mounted on the same railcar 103 as the WSN 104, or to another computing device. Alternatively, or in addition, the WSN 101 can send the information to a PWG 106 located on the locomotive 108 or in a railyard; or to a remote server. For example, the CMU 101, upon receiving the noted information from the WSN 104, can relay the information to the PWG 106 located on the locomotive 108. The information can be processed and analyzed to assess the condition of the brake system 100.

When the brakes are activated by the brake cylinder 200 or the handbrake 270, the resulting load is transferred through the brake rigging 204, and will exert a balanced load on the brake shoes 206 and the dead lever anchor 238. This load is always transferred through the load measuring devices 11 due to their respective locations within the rigging 204, and can be measured by the WSNs 104 associated with the load measuring devices 11.

The respective WSNs 104 associated with each load measuring device 11 provide the excitation voltage to the load sensor 74; register the response of the load sensor 74 to the mechanical loading of the dead lever 234; convert the response into a force reading; and transmit the force reading to the associated CMU 101 other computing device, which forwards the readings to the PWG 102 or other computing device for further analysis, reporting, and alerting.

Pressure Sensor

Figure 16:
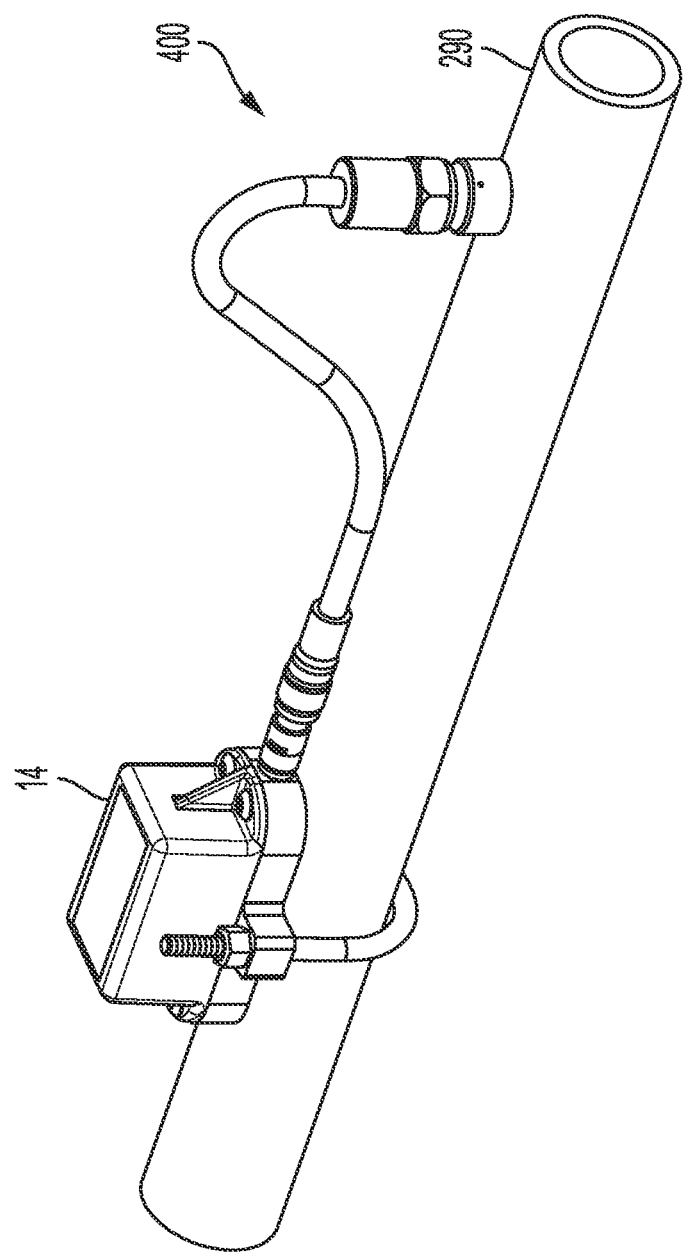
FIG. 16 is a perspective view of a pressure sensor that can be used in variants of the brake monitoring system shown in FIG. 3, showing the pressure sensor installed on a brake pipe.
Figure 17:
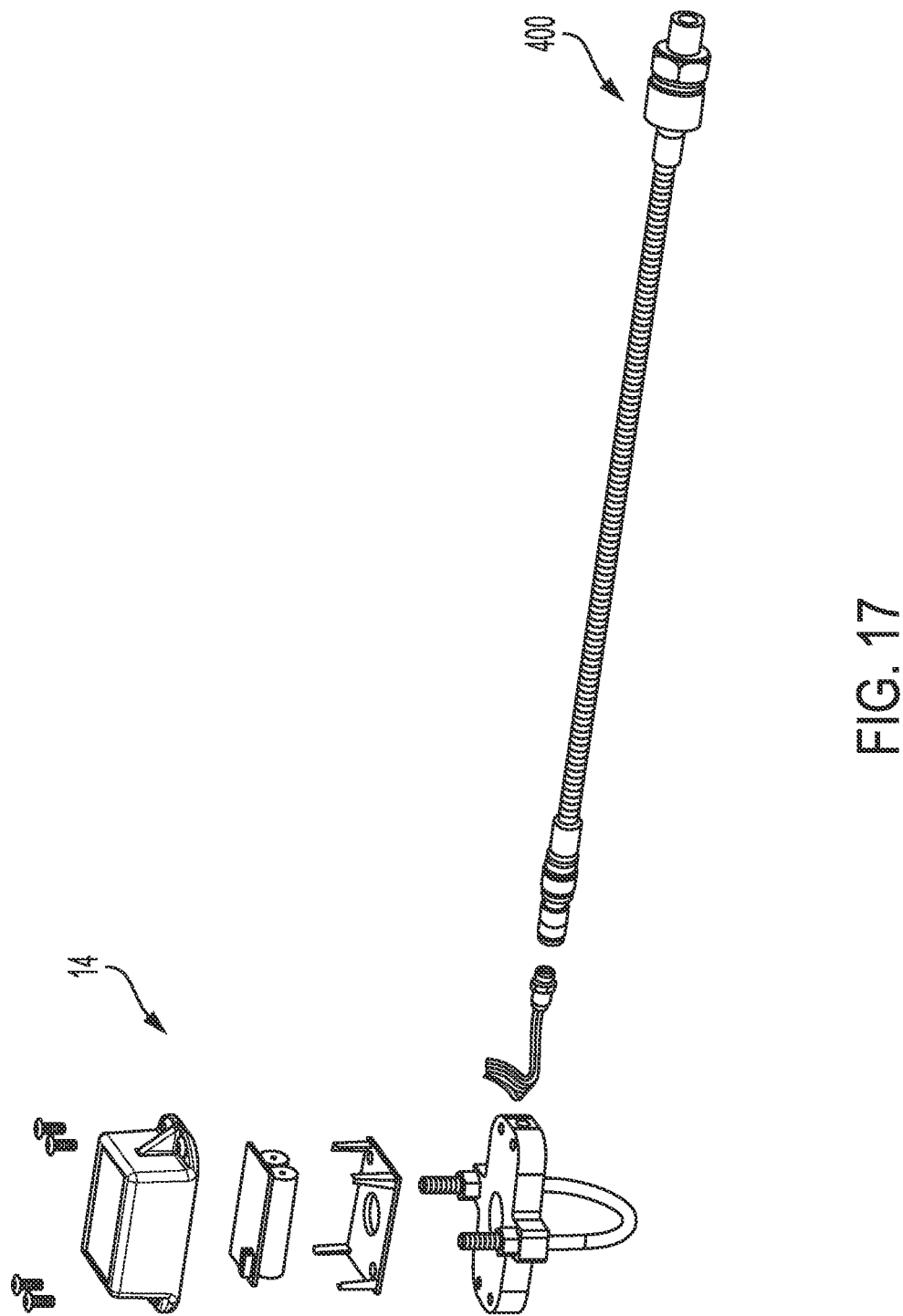
FIG. 17 is an exploded view of the pressure sensor shown in FIG. 16.

FIGS. 16 and 17 depict a pressure sensor 400 that can be incorporated into the system 10 and variants thereof. The sensor 400 can be mounted on air pipe 290, and includes an analog pressure sensor, and a digital pressure switch. The analog pressure sensor and the pressure switch can be attached to the brake pipe 290 as shown in FIG. 16, so that the analog pressure sensor and the pressure switch can sense air pressure within the brake pipe 290. The analog pressure sensor and the pressure switch are communicatively coupled to a WSN 104. The WSN 104 is configured to interface with these components, and in addition, contains the general functionality of WSNs 14 described above.

The pressure switch has a predetermined threshold that will trigger a reading, i.e., an electrical output, in response to an increase or decrease in air pressure above, or below a predetermined threshold. When the trigger is activated, the analog pressure sensor immediately is activated to sample at a fast rate. This information is combined by the WSN 104 into a message that contains the exact time of the trigger; and several pressure readings obtained immediately after the trigger activation at a predetermined and known sampling rate. The message is sent by the WSN 104 to the associated CMU 101 or other computing device, which forwards the message to the PWG 102 or another computing device for further analysis, reporting, and alerting.

In addition, the analog pressure sensor also samples the brake pipe pressure at a continual, but low sample rate. The sampling rate can be set, and changed by the CMU 101 based on the operational state of the railcar 103, e.g. whether the train consist 109 is operating, or parked.

Slack Adjuster Sensor

Figure 18:
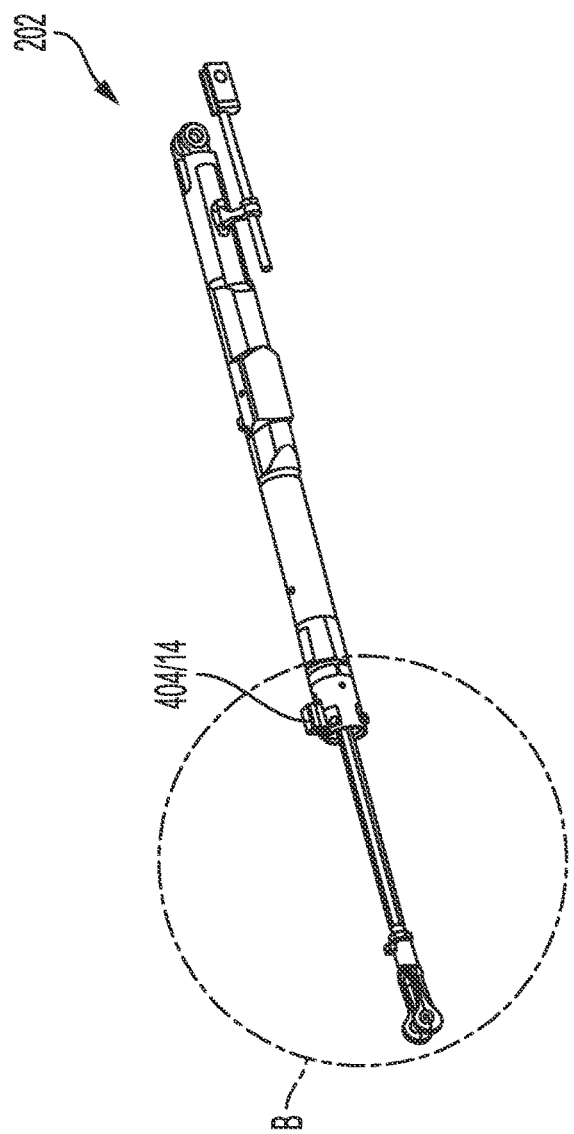
FIG. 18 is a perspective view of a slack adjuster sensor that can be used in variants of the brake monitoring system shown in FIG. 3, installed on a slack adjuster.
Figure 19:
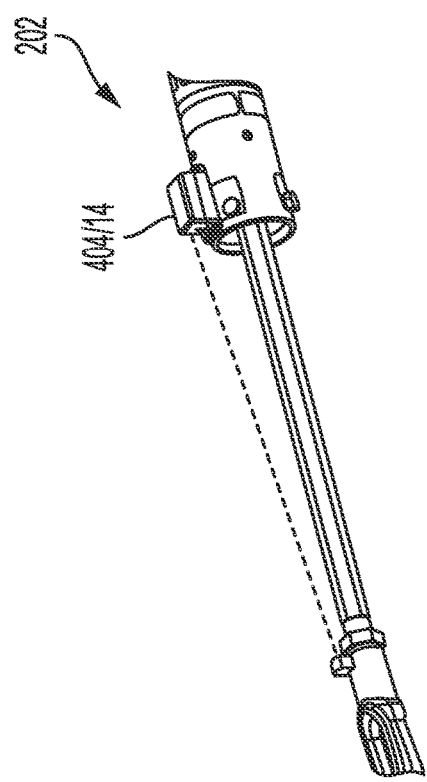
FIG. 19 is a magnified view of the area designated "B" in FIG. 18.

FIGS. 18 and 19 depict a slack adjuster sensor 404 that can be incorporated into the system 10 and variants thereof. The slack adjuster sensor 404 can be used to measure the overall length of the slack adjuster 202, and any changes to that length. The sensor 404 is integrated into a WSN 104. The WSN 104 is configured to interface with the sensor 404, and in addition, contains the general functionality of WSNs 14 described above.

The sensor 404 incorporates a distance-measuring, or displacement sensor, such as a Hall Effect or optical sensor, to determine the distance by which the rod of the slack adjuster 202 is extended from its housing; this distance, in turn, is used to calculate the overall length of the slack adjuster 202. The slack adjuster sensor 404 is an analog sensor that, in conjunction with the WSN 104, calculates and reports a specific distance. The sensor 404 samples at a continual, but slow sampling rate. The resulting readings are sent by the WSN 104 to the associated CMU 101, which forwards the readings to the PWG 102 for further analysis, reporting, and alerting. The sampling rate can be set, and changed by the CMU 101 based on the operational state of the railcar 103.

Wheel Temperature Sensor

Figure 20:
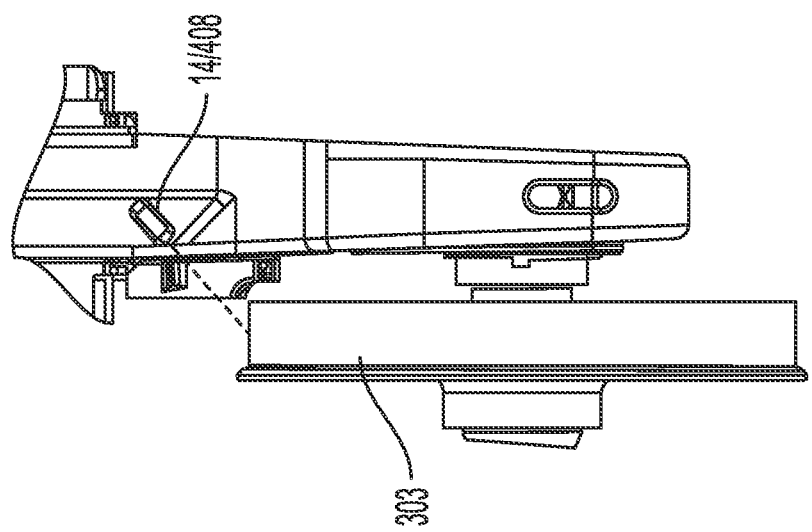
FIG. 20 is a top view of a wheel temperature sensor that can be used in variants of the brake monitoring system shown in FIG. 3.

FIGS. 20 and 21 depict a wheel temperature sensor 408 that can be incorporated into the system 10 and variants thereof. The sensor 408 can be used to monitor the tread temperature of a wheel 303 of the railcars 103. The sensor 408 is integrated into a WSN 104. The WSN 104 is configured to interface with the sensor 408, and in addition, contains the general functionality of WSNs 14 described above.

The wheel temperature sensor 408 is mounted in an area onboard the railcar 103, such as the side frame 320, from where the sensor 408 has an unobstructed line-of-sight to the tread of the wheel 303. The sensor 408 uses a non-contact temperature measurement techniques, such as optical temperature measurement, to determine the temperature of the wheel tread. The sensor 408 is an analog sensor that, in conjunction with the WSN 104, determines and reports a specific temperature. The sensor 408 samples at a continual, but slow sampling rate. The resulting readings are sent by the WSN 104 to the associated CMU 101 or other computing device, which forwards the readings to the PWG 102 or other computing device for further analysis, reporting, and alerting. The sampling rate can be set, and changed by the CMU 101 based on the operational state of the railcar 103.

Operational Capabilities of Brake Monitoring Systems

The system 10 can be configured to determine whether the train consist 109 has effective brakes, without a need for a manual inspection of the brakes. The system 10 also can be configured to act as a monitoring system that can provide a locomotive operator with a "check brake" indicator for any railcars 109 with non-functioning, or malfunctioning brakes. The system 10 also can be configured to provide the operator with the ability to electronically test, from the locomotive 108, for "cold wheel cars," i.e., railcars 103 in which the braking system did not activate during a braking event for the train consist 109. It is believed that the checks provided by some embodiments of the system 10 can result in a waiver for the Class 1A intermediate air brake test, which would allow the limit for non-stop travel of the train consist 109 to be extended to 3,400 miles, from the current limit of 1,000 miles. Additional diagnostic, reporting, and alerting capabilities of the system 10 are described below.

Four variants of the brake-monitoring system 10 are described immediately hereafter. The variants incorporate different types and/or numbers of sensors, to give these variants different levels of diagnostic, reporting, and alerting capabilities.

FIG. 4 schematically depicts a variant of the system 10 in the form of a "minimum" electronic brake monitoring system 10a, used in conjunction with the brake system 100. The system 10a includes a single brake force sensor, referred to in FIG. 4 as a "Dead Lever Sensor." A load measuring device 11 as described above can be used as the brake force sensor; other types of load-measuring devices, including but not limited to other types of strain gauge and displacement sensors, can be used in the alternative. The load measuring device 11 can be mounted at an anchoring point between the rigging 204 of the brake system 100 and the underframe 311 of the railcar 103, in the manner discussed above in relation to the first load measuring device 11. The load measuring device 11 operates in a manner substantially identical to the first load measuring device 11 discussed above. As also discussed above, the WSN 104 of the load sensor 11 communicates wirelessly with a CMU 101 or other computing device located on the same, or another, railcar 103; or communicates wirelessly directly with a PWG 102 located elsewhere on, or off the train consist 109; or with a central server located at a remote location such as a railroad operations center. The CMU 101, in turn, communicates wirelessly with the PWG 102 located in the locomotive 108 or, in alternative embodiments, with a PWG 102 located elsewhere on, or off the train consist 109; or with a central server located at a remote location such as a railroad operations center.

Figure 5:
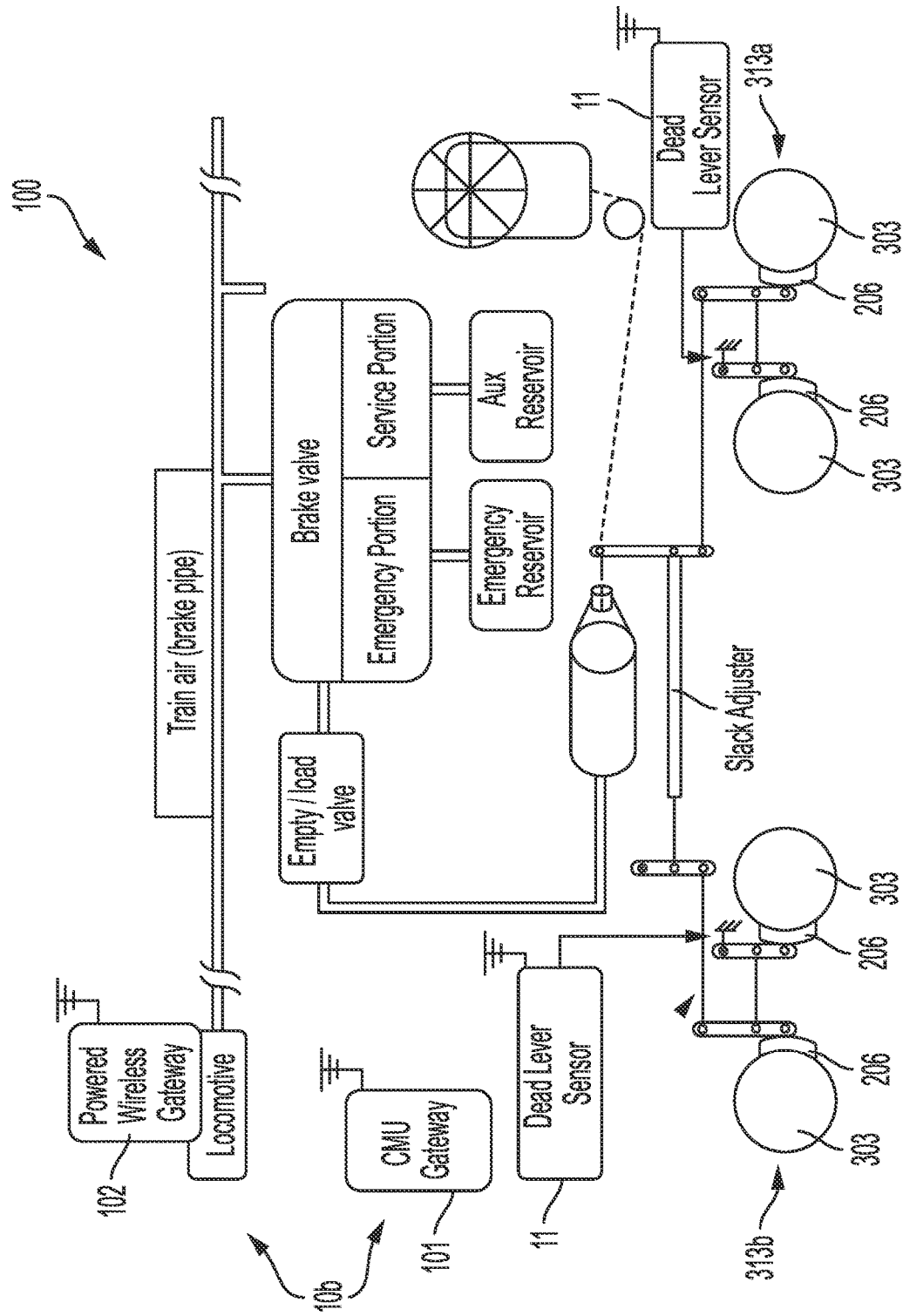
FIG. 5 is a schematic illustration of the train air brake system depicted in FIG. 4, with another variant of the brake monitoring system shown in FIG. 3 incorporated into the air brake system.

FIG. 5 schematically depicts another variant of the system 10 in the form of a "basic" electronic brake monitoring system 10b. The system 10b is substantially identical to the system 10a, with the exception that the system 10b includes two of the brake force sensors. Load measuring devices 11 as described above can be used as the brake force sensors; other types of load-measuring devices can be used in the alternative. The load measuring devices 11 can be mounted at anchoring point between the rigging 204 of the brake system 100 and the underframe 311 of the railcar 103, in the manner discussed above in relation to the first and second load measuring devices 11. Accordingly, the electronic brake monitoring system 10b operates in a similar manner to the system 10a, but provides additional data regarding the braking operation of the railcar 103 due to the presence of an additional brake force sensor.

During operation of the electronic brake monitoring systems 10a, 10b, the load measuring device(s) 11 are configured to sample their respective load readings at regular intervals, e.g., every 30 seconds; and to monitor for rising or falling values in the braking force. Threshold values for the braking force are predetermined, based on known braking characteristics of the railcar(s) 103 during various operational states of the train consist 109, e.g., stopped, moving, etc. The load measuring sensors 11 are further configured to determine when the force readings cross above or below the threshold value corresponding to the current operational state. Whenever a threshold value is crossed, the WSN 104 of the load sensing device 11 sends a notification of the threshold crossing to its corresponding the CMU 101. The CMU 101, in turn, sends that information, along with an identification of the particular railcar 103 associated with the reading, to the PWG 102 on the locomotive 108. The PWG 102 monitors and compares the threshold-crossing information from all of the train-based network-enabled railcars 103 in the train consist 109; and the PWG 102 generates an alert or other indication for the locomotive operator and/or remote operations center upon identifying outlier readings in the threshold crossing information for a particular railcar 103.

Additionally, even in the event that threshold crossings are not detected, a brake-force measurement from each load measuring device 11 can be sent to the associated CMU 101 and the PWG 102 at predetermined intervals, e.g., every 5 minutes. Also, routine status and network health messages regarding the load measurement devices 11, other WSNs 104 and sensors on the railcar 103, and the CMU 101 can be sent to the PWG 102 at predetermined intervals.

As the load measurement devices 11 and the CMU 101 send periodic messages to the PWG 102, the PWG 102 processes the messages in order to generate alerts regarding the brake forces associated with each railcar 103. The locomotive 106 can include a display 98, such as a monitor, tablet, LCD display, etc., depicted schematically in FIGS. 2 and 3. The display 98 communicates with the PWG 102, and is configured to display a real-time, or near real-time alert of specific railcars 103 with malfunctioning or non-functioning brakes, thereby allowing the operator, rail inspectors, and others to readily determine the specific railcars 103 that should be inspected for potential braking issues or other irregularities. Additionally, as discussed below, the electronic brake monitoring systems 10a, 10b allow the operator to perform electronic brake tests when the train consist 109 is at rest, with the brakes of all the railcars 103 set; and the test results for each railcar 103 can be clearly and visibly displayed and confirmed on the display 98.

The systems 10a, 10b can be configured to perform the following logic operations. These particular operations are described for illustrative purposes only; the systems 10a, 10b can be configured to perform other logic operations in addition to, or in lieu of the following operations. Also, the various operating modes discussed below can be selected by the operator via the display 98 or other suitable means.

Train Operating Mode

The brake-monitoring systems 10a, 10b can be configured to operate in a "Train Operating" mode. When operating in this mode, the display 98 within the locomotive 108 provides real-time, or near real-time alerts, while the train consist 109 is operating, regarding specific railcars 103 having non-functional or malfunctioning brakes. The alerts can be enabled or disabled by the train operator during the duration of the trip.

In this operating mode, prior to movement of the train consist 109, the PWG 102 identifies a total count of train-based network-enabled railcars 103, and those railcars 103 having fully-operational CMUs 101 and/or WSNs 104. The systems 10a, 10b can provide the operator, by way of the display 98, with a list manifest of railcars 103 in the train consist 109, a list of railcars 103 requiring maintenance, etc. The PWG 102 then confirms whether the brake-force readings from all of the load measuring devices 11 are in the same threshold state, i.e., above or below a predetermined "Threshold 1" value. In this non-mobile state, any railcars 103 having outlier sensor readings are flagged for inspection or maintenance. Force readings from any load measurement devices 11 generating outlier readings are not monitored in the "Train Operating" mode, to avoid inaccurate or constant alerts.

Once the train consist 109 is underway, the PWG 102 receives notice of any "Threshold 1" crossing events, i.e., changes in the brake-force readings that cross Threshold 1. These notices are provided to the PWG 102 by the load measuring devices 11, via their associated CMUs 101. When such an event occurs in a particular railcar 103, the PWG 102 sets a timer for a predetermined time period, e.g., 2 minutes, and tracks whether any similar threshold crossing events occur in other railcars 103 within that time period. For example, if a predetermined minimum percentage of railcars 103, e.g., 75 percent, register a "Threshold 1" crossing event, any railcars 103 that do not register a Threshold 1 event are flagged by the PWG 102 as having brakes that potentially may be non-functioning or malfunctioning. Also, if any particular railcar 103 registers a certain number of "Threshold 1" crossing events, e.g., 3 crossing events, in the current "Train Operating" mode without the other railcars 103 in the consist 109 registering similar threshold crossings at about the same times, a more definitive flag and/or alert is provided to the operator via the display 98. The flag or alert can be, for example, a visual indication on the display 98, such as "Brakes Need Inspection." Additionally, the railcar name or other identifying data, and the time and location of the incident(s) can be logged and displayed to the operator.

Electronic Brake Test Mode

The systems 10a, 10b also can be configured to operate in an "Electronic Brake Test" mode. This mode permits the train operator to test the brakes while the train consist 109 is not in motion, and to receive the results of the test via the display 98. Unlike the "Train Operating" mode, which may be enabled by the operator or other user for the duration of a specific trip, the "Electronic Brake Test" mode is enabled for a relatively short period of time, e.g., 5 minutes, while the train consist 109 is not in motion.

During the electronic brake test, the PWG 102 first identifies a total count of train-based network-enabled railcars 103 having fully-operational CMUs 101 and/or WSNs 104. A list manifest of the railcars 103 in the train consist 109, a list of railcars 103 requiring maintenance, etc., can be provided to the operator via the display 98. The PWG 102 then confirms whether the brake-force readings from all of the load measuring devices 11 are in the same threshold state, i.e., above or below "Threshold 1" state. In this non-mobile state, any railcars 103 generating outlier readings are flagged for inspection or maintenance. Force readings from the load measurement devices 11 generating outlier readings are not monitored in the "Electronic Brake Test" mode, to avoid inaccurate or constant alerts.

Next, the operator is prompted, via the display 98 or the remote operations center, to charge the braking system so that the air pressure within the brake pipe 290 is within 15 percent of its regulated value, to facilitate release of the brakes. The brake-force readings from all of the load measuring devices 11 are then checked to determine whether the readings are below the "Threshold 1" value, indicating that brakes have been released. After a predetermined period of time, e.g., 2 minutes, any railcars 103 generating brake force measurements that are not below the "Threshold 1" state are flagged and/or reported for further inspection.

Next, the operator is prompted, via a notification on the display 98 or from the remote operations center, to make a "minimum reduction" in brake pressure, e.g., 6 psi, to initiate actuation of the brakes. After this minimum reduction is made, the brake force readings from all of the load measuring devices 11 are checked to determine whether the readings have moved above the "Threshold 1" state, indicating that the airbrakes of the railcars 103 have become actuated. After another predetermined period of time, e.g., two minutes, any railcars 103 having brake force readings that are not above the "Threshold 1" value are flagged and/or reported for further inspection.

Upon completion of the "minimum reduction" test, the operator is prompted to make a "full service reduction" in brake pressure. e.g., an additional 20 psi, after which all of the brake force readings are checked to determine whether they are above a predetermined "Threshold 2" value, indicating that the brakes have become properly set. After a predetermined period of time, e.g., two minutes, any railcars 103 having brake force readings that still are below the "Threshold 2" value are flagged and/or reported for further inspection.

The operator is then prompted to wait an additional period of time, e.g., three minutes, after which the brake force readings are again checked to determine whether the readings are above the "Threshold 2" value. The failing railcars 103, those with readings below the "Threshold 2" value, are flagged and/or reported for further inspection.

Next, the operator is prompted to charge the braking system so that the air pressure within the brake pipe 290 is within 15 percent of its regulated value, to facilitate release of the brakes, after which the brake force readings from all of the load measuring devices 11 are checked to determine whether they are below the "Threshold 1" state, indicating that the brakes have been released. After another predetermined period of time, e.g., 2 minutes, any railcars 103 generating brake force readings that are not below the "Threshold 1" state are flagged and/or reported for further inspection.

When the "Electronic Brake Test" is completed, all or a portion of the results can be displayed to the operator on the display 98 within the locomotive 108. For example, any railcars 103 that did not pass any stage of the "Electronic Brake Test" can be listed on the display, with each failed railcar 103 identified along with the stage and step(s) at which the failure occurred, the time of failure, etc. Statistics of the test results also can be displayed and/or transmitted to a remote operations center. These statistics can include, for example, information about the operator who conducted the test; the time and duration of the test; the number and identities of the railcars 103 tested; the numbers and identities of the railcars 103 that passed and failed; the percentage of railcars 103 that passed and failed, etc. If a predetermined percentage, e.g., 85 percent, or greater of the railcars 103 pass the "Electronic Brake Test," the display 98 can indicate to the operator that the train consist 109 passed the brake test; for example, the message "Overall Test Passed" can be displayed in green on the display 98 under such circumstances. With such an electronic test mode that permits the braking systems of all of the railcars 103 in the train consist 109 to be tested automatically or semi-automatically, on a collective basis, in a relatively short period of time, manual tests of the brake system of each individual railcar 103 can be conducted less frequently because the manual testing can be reduced or replaced by this quicker, more reliable, and automated brake test, allowing the railcars 103 to operate more frequently and with less downtime.

Figure 6:
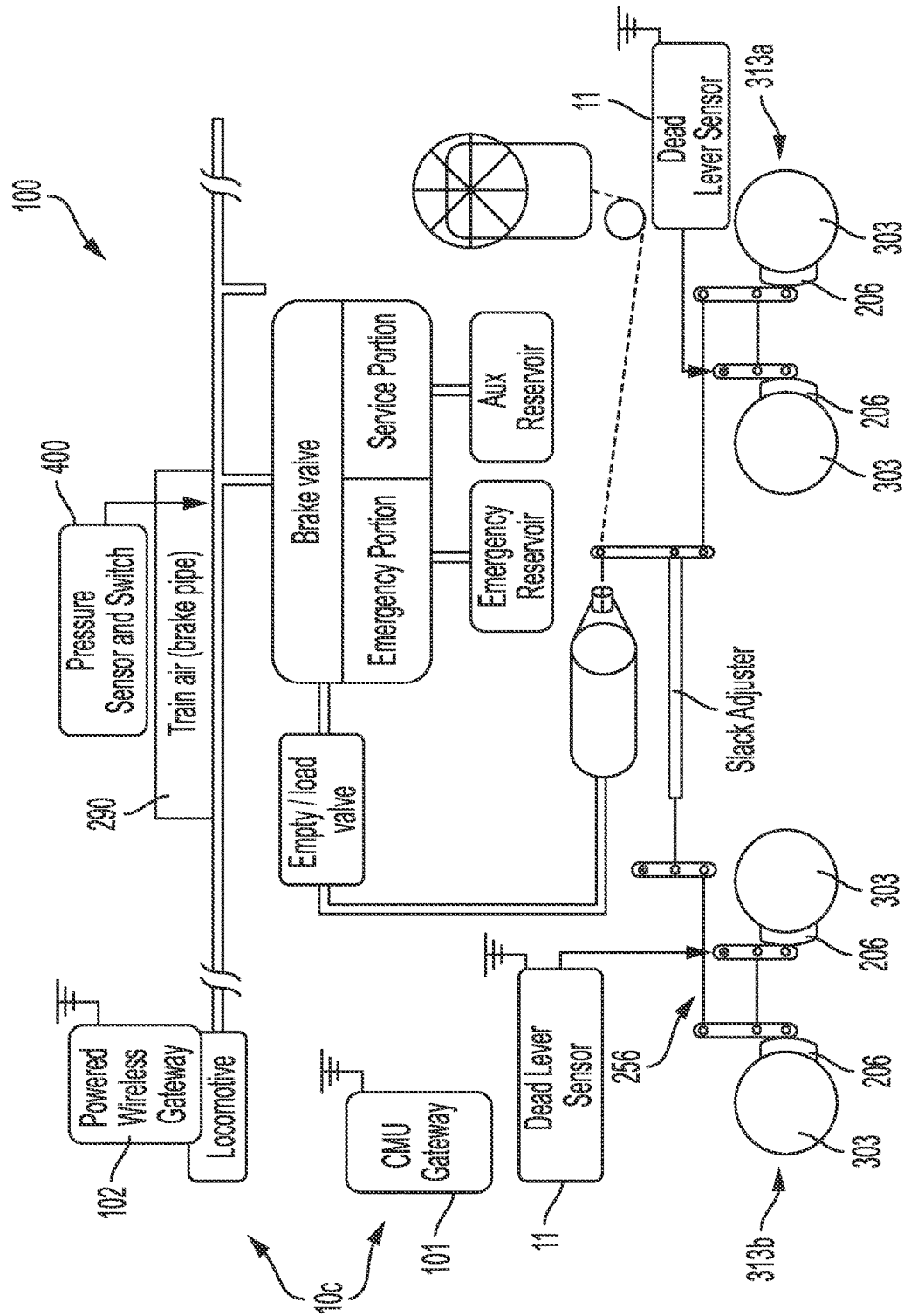
FIG. 6 is a schematic illustration of the train air brake system depicted in FIGS. 4 and 5, with another variant of the brake monitoring system shown in FIG. 3 incorporated into the air brake system.
Figure 7:
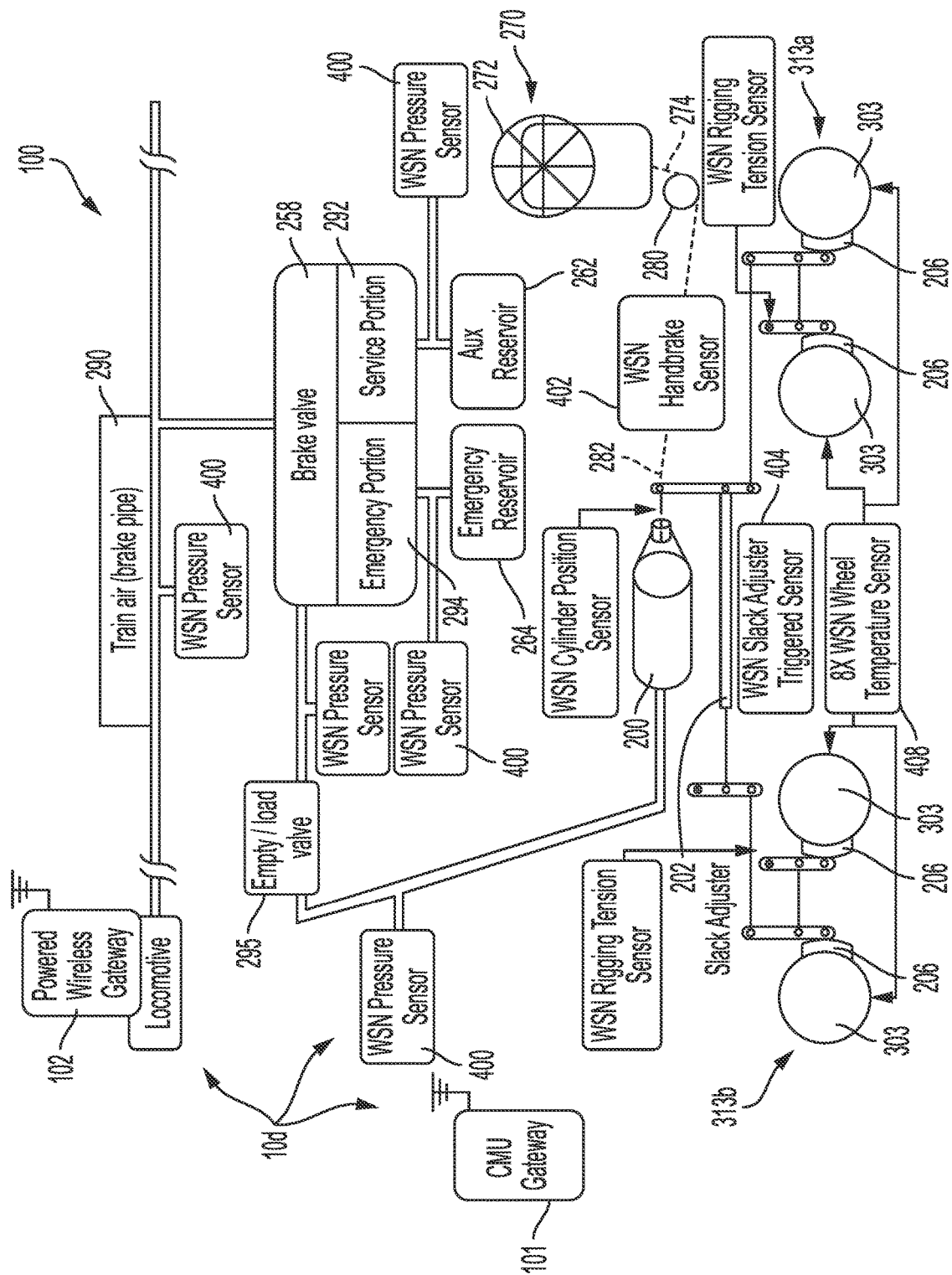
FIG. 7 is a schematic illustration of the train air brake system depicted in FIGS. 4-6, with another variant of the brake monitoring system shown in FIG. 3 incorporated into the air brake system.
Figure 8:
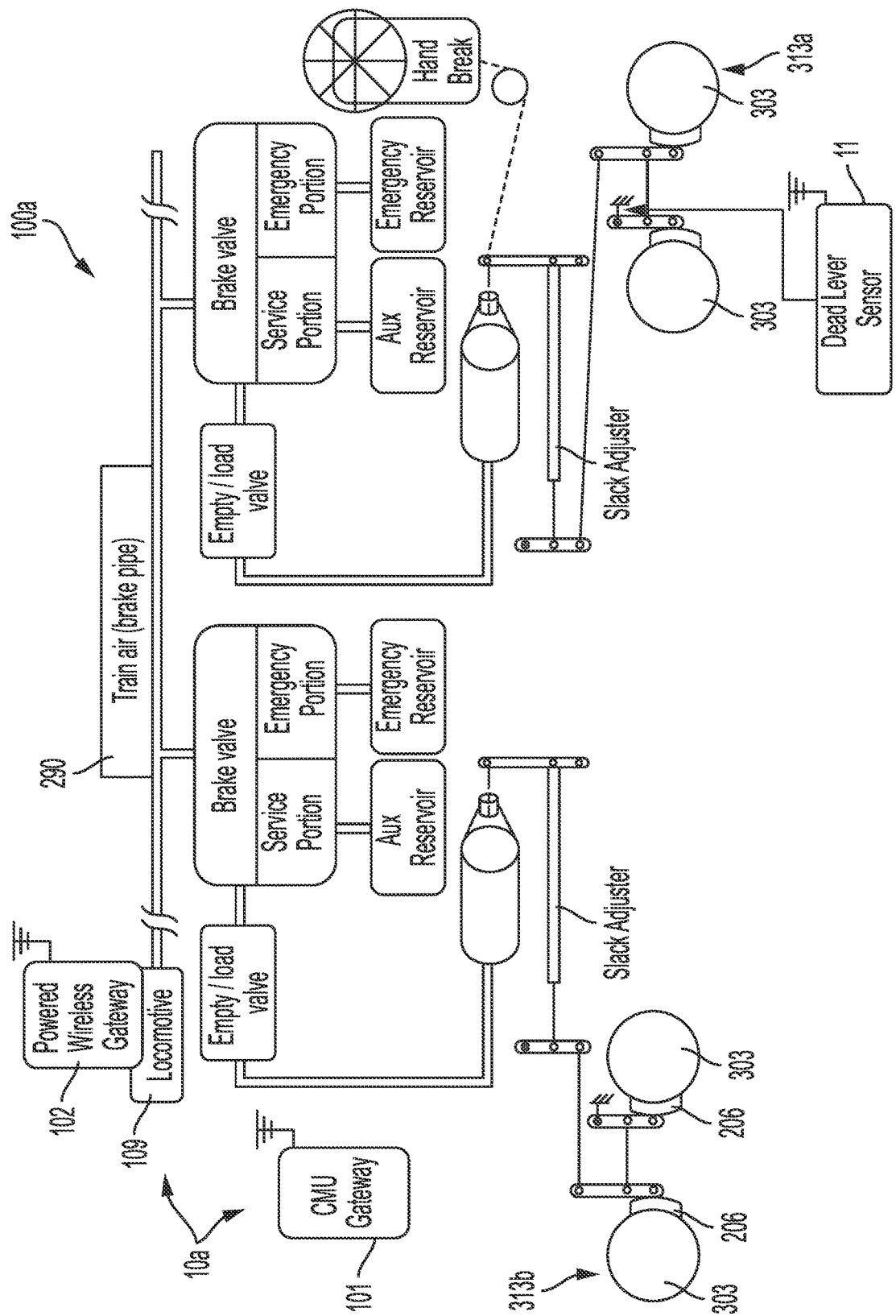
FIG. 8 is a schematic illustration of a train air brake system having truck mounted brake rigging, and incorporating the brake monitoring system shown in FIG. 4.
Figure 9:
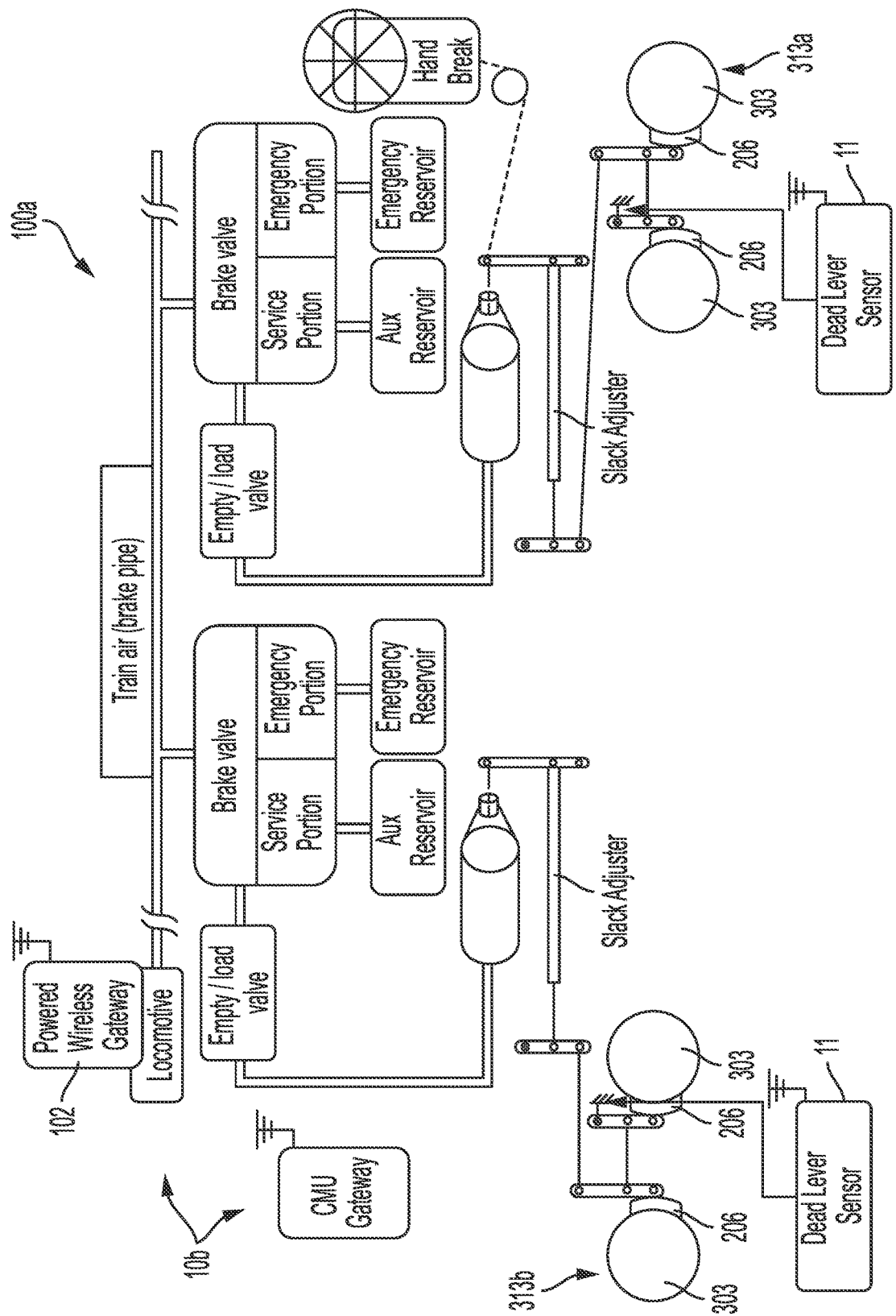
FIG. 9 is a schematic illustration of the train air brake system depicted in FIG. 8, incorporating the brake monitoring system shown in FIG. 5.
Figure 10:
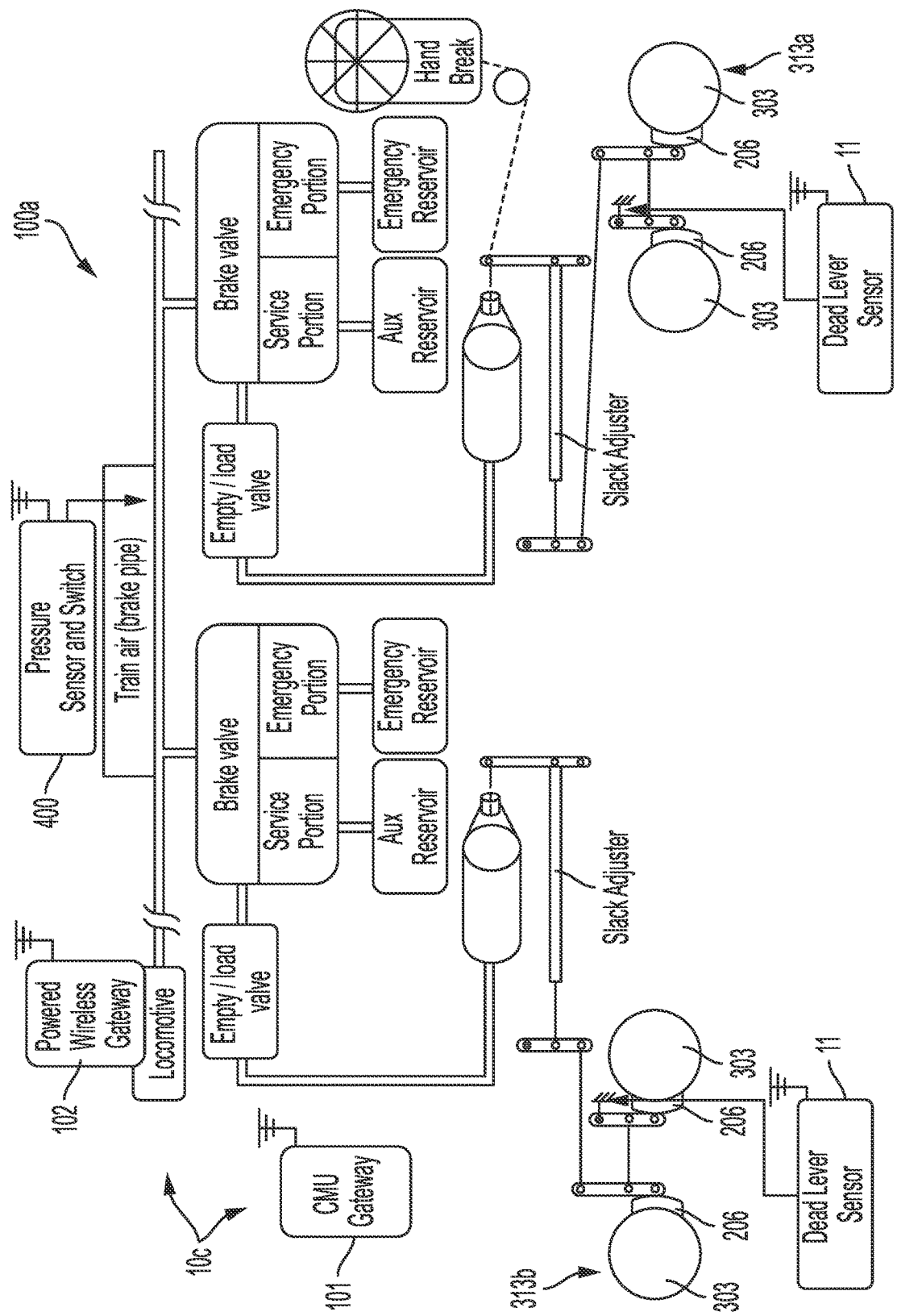
FIG. 10 is a schematic illustration of the train air brake system depicted in FIGS. 8 and 9, incorporating the brake monitoring system shown in FIG. 6.
Figure 11:
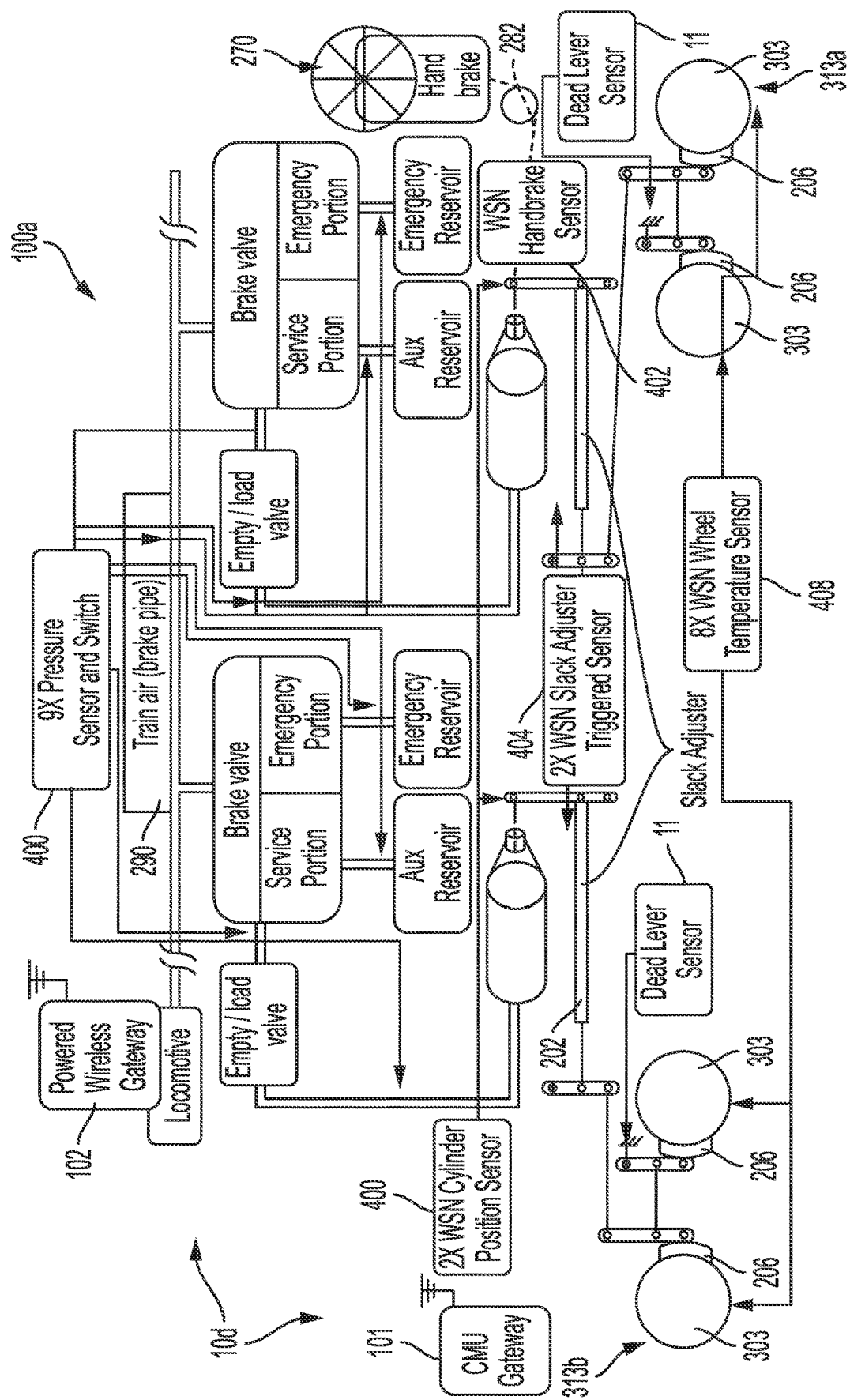
FIG. 11 is a schematic illustration of the train air brake system depicted in FIGS. 8-10, incorporating the brake monitoring system shown in FIG. 7.

FIGS. 6 and 7 schematically depict other variants of the electronic brake-monitoring system 10 in the form of an electronic brake monitoring system 10c and an electronic brake monitoring system 10d, respectively. The "advanced" electronic brake monitoring system 10c and the "full/complete" brake monitoring system 10d include, in addition to one or more of the load measuring sensors 11 as described above in relation to the systems 10a, 10b, one or more brake pressure sensors.

As shown in FIG. 6, the brake monitoring system 10c includes a single brake pressure sensor. The brake pressure sensor can be, for example, the pressure sensor 400 described above; other types of pressure sensors can be used in the alternative. As noted above, the pressure sensor 400 includes both an analog sensor and a digital switch. The pressure sensor 400 associated with each railcar 103 is mounted on the section of brake pipe 290 on that particular railcar 103. The addition of the brake pressure sensor 400 in the system 10c allows the system 10c to logically differentiate between braking applied by the air brake system of the railcar 103 and braking applied by the hand brake 270, without the need to measure the chain tension within the hand brake 270 using the handbrake sensor 402 of other suitable means.

The brake monitoring system 10d includes a plurality of brake pressure sensors and brake force sensors; and also includes other types of sensors. These other sensors can include, for example, the hand brake sensor 402, the cylinder position sensor 404, and the wheel temperature sensor 408 described above. The brake pressure sensors and the brake force sensors can be, for example, the respective pressure sensors 400 and load measuring devices 11 described above. The additional sensors of the system 10d increase the amount, and the types of data available to monitor the status of the brake systems 100 of the railcars 103, and as discussed below, facilitate additional diagnostic testing, reporting, and alerts that the systems 10a, 10b, 10c are not equipped to provide. Also, although the readings from the cylinder position sensor 404 and the wheel temperature sensor 408 are not used in the below-described logical operations associated with the system 10*d*, these readings nevertheless can supplement the information available to the operator and/or the remote railroad operations center regarding the state of the brake system 100. As disclosed herein, the brake monitoring system 10 incudes a total of 18 sensors; more, or fewer sensors and/or different sensor locations can be used in variants of the system 10*d*.

The electronic brake monitoring systems 10*c*, 10*d* can operate in the "Train Operating" mode and "Electronic Brake Test" mode described above in relation to the systems 10*a*, 10*b*. The presence of the additional sensors in the systems 10*c*, 10*d*, and particularly the brake pressure sensors 400, however, enables the systems 10*c*, 10*d* to provide additional information regarding the status and/or operation of the brake systems 100 of the railcars 103, and the ability to logically differentiate between braking applied by the air brake system and braking applied by the hand brake 270. For example, FIGS. 22A-C include tables that display the logical operations that can be performed by the systems 10*c*, 10*d*, using the brake-force values from the load measuring device (s) and the pressure readings from the pressure sensor(s) 400, and other information. The particular values of brake force and air pressure presented in FIGS. 22A-C are presented for illustrative purposes only; other values for these parameters can be used in the alternative.

FIG. 22A details, in tabular form, logical operations that can be performed in connection with electronic brake testing and train consist reporting by the systems 10*c*, 10*d*. The procedures followed during the electronic brake testing can be substantially the same as, or similar to those discussed above in relation to the systems 10*a*, 10*b*; and the potential anomalies identified during this testing, and the resulting reporting and alerts, likewise can be similar to those described in relation to the systems 10*a*, 10*b*.

As can be seen in FIG. 22A, however, the availability of pressure readings from the sensor(s) 400 gives the systems 10*c*, 10*d* capabilities in addition to those of the systems 10*a*, 10*b*. For example, the systems 10*c*, 10*d* can identify location of air leak in the air brake system of the train consist 109 by comparing the pressure readings obtained from the pressure sensors 400 on the various railcars 103, and identifying the point in the train consist 109 at which the pressure readings drop by a predetermined amount.

Also, the systems 10*c*, 10*d* can validate the assets of the train consist 109 by verifying that the railcars 103 on the manifest register pressure reductions in response to the first pressure reduction during the electronic braking test. In addition, the systems 10*c*, 10*d* can validate the consist order by timestamping the exact time of first pressure reduction during the electronic braking test; and comparing the times at which the pressure reduction propagated to each downstream railcar 103, thereby providing the order or the railcars 103 within the train consist 109.

FIG. 22B details, in tabular form, the logical operations that can be performed in connection with a train securement audit and hand brake damaging events testing. These diagnostic activities require knowledge of whether the hand brake 270 is set, and therefore can be performed by the systems 10*c*, 10*d*, which, as noted above, can make the logical differentiation between braking applied by the air brake system and braking applied by the hand brake.

As shown in FIG. 22B, the system 10*d* is capable of determining when the hand brake 270 is on, i.e., engaged, based on the hand brake-force reading provided by the hand brake sensor 402. The system 10*d* also can identify an "air over hand brake application," i.e., an event in which the hand brake 270 is applied while the airbrakes are engaged. The system 10*d* recognizes this condition when the train consist 109 is stopped; the brake pipe pressure is at a level indicating that the air brakes have been applied; and the hand brake sensor 402 registers an increase in hand brake force indicating that the hand brake 270 had been applied.

As also can be seen in FIG. 22B, the systems 10*c*, 10*d* can identify railcars 103 that have been moved while the hand brake 270 is applied. The systems 10*c*, 10*d* recognize this condition when the train consist 109 begins moving while the brake pipe pressure is at a level indicating that the air brakes have been released; and the load sensing devices 11 or the hand brake sensor 402 registers a hand brake force above a threshold indicating that the hand brake 270 is applied.

FIG. 22C details, in tabular form, the logical operations that can be performed in connection with detecting causes for line of road failures. As can be seen in FIG. 22C, the system 10*d* can identify the location of break in the brake pipe 290, and/or the source of a transient event that caused a UDE brake application. The systems 10*c*, 10*d* determine that a UDE brake application has occurred by recognizing that a predetermined, nearly instantaneous drop in brake pipe pressure has occurred, and then locating the source of the drop by comparing timestamped pressure readings from the pressure sensors 400 of the railcars 103 throughout the train consist 103.

As also can be seen in FIGS. 22C, the systems 10*c*, 10*d* can identify the railcar 103 responsible for the UDE brake application by identifying the time at which a sustained reduction in brake pipe pressure below a predetermined threshold occurred, and identifying the railcar 103 associated Thus, as detailed in tables of FIGS. 22A-C, utilization of both brake pressure sensor(s) and brake force sensor(s), either alone or in combination, can facilitate more extensive diagnostics, reporting, and alerts than the use of brake force sensors alone, and can facilitate the determination and display of more than just brake-system malfunctions or failures.

FIGS. 8-11 respectively depict the brake monitoring systems 10*a*, 10*b*, 10*c*, 10*d* incorporated into the brake system 100*a* having truck mounted brake rigging.

Various diagnostic, alerting, and reporting capabilities of the brake monitoring systems 10*a*, 10*b*, 10*c*, 10*d* are displayed in tabular form in FIGS. 23A-E. Specifically, these tables list the capabilities of, and denote the particular diagnostic, alerting, and reporting functions that can be performed by a "Brake Monitoring Minimum" system, i.e., the system 10*a*; a "Brake Monitoring Basic" system, i.e., the system 10*b*; a "Brake Monitoring Advanced" system, i.e., the system 10*c*; and a "Brake Monitoring Full/Complete" system, i.e., the system 10*d*. This listings in these tables are presented for illustrative purposes only, and are not limiting, as each of the brake monitoring systems 10*a*, 10*b*, 10*c*, 10*d* can have capabilities that at not listed in FIGS. 23A-F.

As can be seen in Tables 23A-F, the systems utilizing more sensors, and more different types of sensors, generally provide more extensive diagnostic, alerting, and reporting capabilities.

Actions Performed Before Departure From Rail Yard

Table 23A details the diagnostic, alerting, and reporting actions that can be performed before the train consist 109 departs a rail yard. As can be seen from Table 23A, all of the systems 10, 10*a*, 10*b*, 10*c* have the capability to identify the location of an air leak in the airbrake system 100 so that a targeted inspection can be performed. All of these systems also have the capability to identify any railcar 103 or locomotive 108 with a brake issue, and to automatically generate a maintenance request so that a brake inspection can be conducted prior to departure. All of the noted systems also have the capability to confirm that the hand brakes 270 of all the railcars 103 in the train consist 109 have been released prior to departure.

Table 23A also indicates that only the systems 10c, 10d, as a result of their additional sensing and data-processing capabilities described above, have the additional capability to perform, from the locomotive 108, an electronic test of the brake system 100 sufficient to act as an acceptable alternative process to the standard Class 1A brake test defined in 49 CFR 232.205-Class 1A brake test-initial terminal inspection, i.e., use of the systems 10c, 10d can eliminate the need to conduct the noted test prior to every departure of the train consist 109.

As further indicated by Table 23A, only the systems 10c, 10d have the capability to confirm which railcars 103 are in the train consist 109 during an electronic air brake test and, based on this information, inform railroad dispatch of any discrepancies in the train manifest, such as out of route railcars. Also, only the systems 10c, 10d have the capability to validate the consist order and inform railroad dispatch of the confirmation.

Actions Performed in Connection with Undesired Emergency Brake Application.

Table 23B details the diagnostic, alerting, and reporting actions that can be performed during, or immediately after a line of road undesired emergency (UDE) brake application. As can be seen from this table, only the systems 10c, 10d, as a result of their additional sensing and data-processing capabilities described above, have the capability to identify the location of a break in the train air line, i.e., the air pipe 290, so that a targeted inspection can be performed. Table 23B also indicates that only the systems 10c, 10d have the capability to identify the source location of a transient event causing the UDE brake application, so that an operations review can be conducted. As also can be seen from Table 23B, only the systems 10c, 10d can identify the locomotive 109 or railcar 103 responsible for the UDE brake application and automatically generate a maintenance request, so that an inspection of the locomotive 109 or railcar 103 can be conducted.

Actions Performed During Securement of Train Consist.

Table 23C details the diagnostic, alerting, and reporting actions that can be performed during securement of the train consist 109 inside or outside of a railyard. As can be seen from Table 23C, only the systems 10c, 10d, as a result of their additional sensing and data-processing capabilities described above, have the capability to confirm the status of both the air brake system and the hand brake 270 on each railcar 103 before the train operator leaves the train consist 109 unattended, and to report the status to the train operator and train dispatch.

As also can be seen from Table 23C, only the systems 10c, 10d have the capability to identify the track grade, i.e., slope, on which the train consist 109 is located; to calculate the minimum number of hand brakes 270 in the train consist 109 that need to secured, i.e., applied, for that particular grade; count the number of hand brakes 270 that have been secured; confirm proper securement of the train consist 109 based on the status of the hand brakes 270; report to the train operator and dispatch when the number of applied hand brakes 270 exceeds the minimum required for the grade; and confirm the status of all the hand brakes 270 before the train operator leaves the train consist 109 unattended.

Table 23C also indicates that only the systems 10c, 10d have the capability to confirm the operating practice of securing a train with the hand brakes 270; this information subsequently can be used for safety and compliance audits.

Actions Performed During Operation of the Train Consist.

Table 23D details the diagnostic, alerting, and reporting actions that can be performed during operation of the train consist 109. As can be seen from Table 23D, all of the systems 10a, 10b, 10c, 10d have the capability to confirm, while the train consist 109 is in motion, that the train consist 109 has effective airbrakes.

Table 23D also shows that all of the systems 10a, 10b, 10c, 10d can identify specific railcars 103 exhibiting low air-braking force, and automatically generate a maintenance request to facilitate maintenance at the next available maintenance opportunity.

As also can be seen from Table 23D, only the systems 10b, 10c, 10d, as a result of their additional sensing and data-processing capabilities described above, can electronically test the airbrake system of train consist 109 from the locomotive 108, in a manner sufficient to allow such testing to be performed an alternative to, i.e., in lieu of, the standard Class 1A brake test as defined 49 CFR 232.205-Class 1A brake test-Intermediate inspection. Current regulations require that the Class 1A brake test-Intermediate inspection test be performed after every 1,000 miles of travel of the train consist 109. It has been estimated by railroad operators that eliminating the need for this particular test can save between 30 and 90 minutes of operating time during every 1,000-mile leg of travel of the train consist 109.

As indicated in Table 23D, only the systems 10a, 10b, 10c have the capabilities to electronically test, from the locomotive 108, for "cold wheel railcars," i.e., individual railcars 103 on which the braking was not applied during a braking event of the train consist 109.

Table 23D also shows that only the systems 10c, 10d, as a result of their additional sensing and data-processing capabilities described above, have the capability to identify the location of a break in the brake pipe 290, such as a broken air hose; or the weakest brake valve 258, following a UDE brake application, so that an appropriate inspection can be conducted. Table 23D further indicates that only the systems 10c, 10d have the capability to identify individual railcars 103 that were moved with their hand brake 270 applied. Identifying such railcars 103 permits any resulting wheel damage to be correlated to the incorrect hand-brake application; and can be used to educate the responsible parties to prevent future damage, and/or to bill responsible parties for any resulting damages.

Actions Performed During Maintenance Activity on the Train Consist.

Table 23E details the diagnostic, alerting, and reporting actions that can be performed during maintenance of the train consist 109. As can be seen from Table 23E, all of the systems 10a, 10b, 10c, 10d have the capability to identify, and report railcars that have properly operating brakes. This feature can reduce the number of scheduled brake tests (SCABTs) that are performed unnecessarily. Table 23E also shows that the systems 10a, 10b, 10c, 10d can generate and provide a report identifying railcars 103 that have improperly-operating and/or non-effective brakes, so that necessary testing and maintenance can be properly targeted.

Table 23E further indicates that all of the systems 10a, 10b, 10c, 10d also have the capability to generate and provide a report of individual railcars 103 exhibiting low brake force, and to automatically generate a maintenance request so that necessary testing and maintenance can be properly targeted.

Table 23E also indicates that only the systems 10c, 10d, as a result of their additional sensing and data-processing capabilities described above, have the capability to generate and provide a report of individual railcars 103 that were moved with the hand brake 270 applied. Such reports can be used to properly target necessary inspections and maintenance of the affected wheels, and to bill the responsible parties for damages. Table 23E also shows that only the systems 10c, 10d have the capability to generate and supply a report of railcars that have experienced an "air over hand brake" application, i.e., the application of air braking while the hand brake 270 is applied. These reports can be used to properly target necessary inspections and maintenance of the affected wheels, and to bill the responsible parties As also can be seen from FIG. 23E, only the system 10d, as a result of its additional sensing and data-processing capabilities described above, has the capability to identify which specific part of the brake system 100 of a railcar experienced a malfunction, i.e. the brake valve 258, brake cylinder 200, slack adjuster 202, etc. This information can be used to perform a targeted repair of the affected component(s).

In addition to monitoring and displaying various brake system events, faults, etc. as discussed above, the brake monitoring system 10 can be configured to identify other events, faults, etc., including those unrelated to braking systems. For example, the system 10 can be configured monitored for, and provide an indication of events such as arrival and departure of the train consist 109 to and from a geofence; starting and stopping motion; exceedance of temperature thresholds; exceedance of impact-magnitude thresholds; demurrage monitoring, etc. Also, event rules can be mixed and matched as necessary or otherwise desired in a particular application. For example, the system 10, and variants thereof, can be configured to monitor for, and provide an indication of the exceedance of temperature threshold, on a loaded asset, within a geofence. The results of these various monitored events may then be reported to the operator, railway supervisors, inspectors, etc., with and frequency and/or timing of such reporting also being customizable to a particular application.

What is claimed is:

1. A method for monitoring at least one railcar, comprising:
   applying a braking force to wheels of the at least one railcar;
   causing a mechanical load to be sensed by or applied to at least one first sensor device when the braking force is being applied to the wheels of the at least one railcar;
   receiving, by a computing device, an electrical signal from the at least one first sensor device;
   analyzing, by the computing device, the electrical signal to assess an operational condition of a brake system of the at least one railcar; and
   causing, by the computing device, the operational condition to be provided to an operator of the at least one railcar or a communication device located remote from the at least one railcar;
   wherein application of the mechanical load to the at least one first sensor is at least partially caused because the at least one first sensor mechanically couples an articulating rigging of the brake system to a non-articulating underframe of the at least one railcar.

2. A method for monitoring at least one railcar, comprising:
   applying a braking force to wheels of the at least one railcar;
   causing a mechanical load to be sensed by or applied to at least one first sensor device when the braking force is being applied to the wheels of the at least one railcar;
   receiving, by a computing device, an electrical signal from the at least one first sensor device;
   analyzing, by the computing device, the electrical signal to assess an operational condition of a brake system of the at least one railcar; and
   causing, by the computing device, the operational condition to be provided to an operator of the at least one railcar or a communication device located remote from the at least one railcar;
   wherein application of the mechanical load to the at least one first sensor is at least partially caused because the at least one first sensor is located at a location within an articulating rigging of the brake system that is downstream from a brake lever of the brake system.

3. The method according to claim 2, wherein the location resides between two rods of the articulating rigging of the brake system.

4. A method for monitoring at least one railcar, comprising:
   applying a braking force to wheels of the at least one railcar;
   causing a mechanical load to be sensed by or applied to at least one first sensor device when the braking force is being applied to the wheels of the at least one railcar;
   receiving, by a computing device, an electrical signal from the at least one first sensor device;
   analyzing, by the computing device, the electrical signal to assess an operational condition of a brake system of the at least one railcar;
   causing, by the computing device, the operational condition to be provided to an operator of the at least one railcar or a communication device located remote from the at least one railcar; and
   performing operations by an accelerometer or gyroscope to monitor attributes of the at least one railcar;
   wherein the operational condition of the brake system is assessed by further analyzing an output from the accelerometer or gyroscope.

5. The method according to claim 4, further comprising generating an alert regarding a braking force associated with the at least one railcar based on the analyzing of the output from the accelerometer or gyroscope.

6. The method according to claim 4, further comprising displaying in near real-time a visual alert of a malfunctioning brake of the at least one railcar based on the analyzing of the output from the accelerometer or gyroscope.

7. A method for monitoring at least one railcar, comprising:
   applying a braking force to wheels of the at least one railcar;
   causing a mechanical load to be sensed by or applied to at least one first sensor device when the braking force is being applied to the wheels of the at least one railcar;
   receiving, by a computing device, an electrical signal from the at least one first sensor device;
   analyzing, by the computing device, the electrical signal to assess an operational condition of a brake system of the at least one railcar; and causing, by the computing device, the operational condition to be provided to an operator of the at least one railcar or a communication device located remote from the at least one railcar;

obtaining information specifying a position of a valve, the valve having a first position indicating that the at least one railcar is loaded and a second position indicating that the at least one railcar is empty; and modifying an amount of air to be supplied to a brake cylinder during braking operations of the at least one railcar based on the position of the valve.

8. The method according to claim 7, wherein the amount of air is increased when the valve is in the first position and the amount of air is reduced when the valve is in the second position.

9. A method for monitoring at least one railcar, comprising:

applying a braking force to wheels of the at least one railcar;

causing a mechanical load to be sensed by or applied to at least one first sensor device when the braking force is being applied to the wheels of the at least one railcar;

receiving, by a computing device, an electrical signal from the at least one first sensor device;

analyzing, by the computing device, the electrical signal to assess an operational condition of a brake system of the at least one railcar;

causing, by the computing device, the operational condition to be provided to an operator of the at least one railcar or a communication device located remote from the at least one railcar;

monitoring an air pressure in a brake pipe of the brake system using a pressure switch;

detecting when the air pressure increases above a first threshold value or decreases below a second threshold value;

triggering at least one pressure reading by the pressure switch in response to a detection that the air pressure increased above the first threshold or decreased below the second threshold;

receiving, by the computing device, first sensor data from the pressure switch that indicates the at least one pressure reading; and generating, by the computing device, a message containing the first sensor data and a time of at which the at least one pressure reading was triggered.

10. The method according to claim 9, further comprising:

performing operations by a pressure sensor to continually sample the air pressure in the brake pipe at a sampling rate; and receiving, by the computing device, second sensor data from the pressure sensor that indicates the air pressure in the brake pipe over a duration of time;

wherein the message additionally contains the second sensor data.

11. The method according to claim 10, further comprising adjusting the sampling rate of the pressure sensor based on an operational state of the at least one railcar.

12. The method according to claim 11, wherein the operational state comprises parked or operating.

13. A method for monitoring at least one railcar, comprising:

applying a braking force to wheels of the at least one railcar;

causing a mechanical load to be sensed by or applied to at least one first sensor device when the braking force is being applied to the wheels of the at least one railcar;

receiving, by a computing device, an electrical signal from the at least one first sensor device;

analyzing, by the computing device, the electrical signal to assess an operational condition of a brake system of the at least one railcar; and causing, by the computing device, the operational condition to be provided to an operator of the at least one railcar or a communication device located remote from the at least one railcar;

performing operations by a sensor to detect changes in a length of a slack adjuster in the brake system; and wherein the operational condition of the brake system is assessed by further analyzing an output from the sensor.

14. A method for monitoring at least one railcar, comprising:

applying a braking force to wheels of the at least one railcar;

causing a mechanical load to be sensed by or applied to at least one first sensor device when the braking force is being applied to the wheels of the at least one railcar;

receiving, by a computing device, an electrical signal from the at least one first sensor device;

analyzing, by the computing device, the electrical signal to assess an operational condition of a brake system of the at least one railcar; and causing, by the computing device, the operational condition to be provided to an operator of the at least one railcar or a communication device located remote from the at least one railcar; and performing operations by a sensor to sample a tread temperature of at least one said wheel of the at least one railcar at a sampling rate;

wherein the operational condition of the brake system is assessed by further analyzing an output from the sensor.

15. The method according to claim 14, wherein the sampling rate is adjusted based on an operational state of the at least one railcar.

16. The method according to claim 15, wherein the operational state comprises parked or operating.

17. The method according to claim 14, wherein the sensor is mounted at a location on the at least one railcar that provides the sensor with an unobstructed line-of-sight to a tread of the at least one said wheel.

18. A method for monitoring at least one railcar, comprising:

applying a braking force to wheels of the at least one railcar;

causing a mechanical load to be sensed by or applied to at least one first sensor device when the braking force is being applied to the wheels of the at least one railcar;

receiving, by a computing device, an electrical signal from the at least one first sensor device;

analyzing, by the computing device, the electrical signal to assess an operational condition of a brake system of the at least one railcar;

causing, by the computing device, the operational condition to be provided to an operator of the at least one railcar or a communication device located remote from the at least one railcar;

receiving, by the computing device, an indication that a threshold event has occurred at the at least one railcar, the threshold event occurring when an amount of the brake force being applied to the wheels of the at least one railcar reaches a certain value;

causing, by the computing device, enablement of a timer responsive to the indication that the threshold event has occurred at the at least one railcar; and determining, by the computing device, whether the threshold event has occurred at one or more other railcars of a plurality of railcars during a predetermined period of time.

19. The method according to claim 18, further comprising concluding by the computing device that a brake system of at least one of the plurality of railcars is malfunctioning when the threshold event did not occur thereat during the predetermined period of time.

20. A method for monitoring at least one railcar, comprising:

applying a braking force to wheels of the at least one railcar;

causing a mechanical load to be sensed by or applied to at least one first sensor device when the braking force is being applied to the wheels of the at least one railcar;

receiving, by a computing device, an electrical signal from the at least one first sensor device;

analyzing, by the computing device, the electrical signal to assess an operational condition of a brake system of the at least one railcar;

causing, by the computing device, the operational condition to be provided to an operator of the at least one railcar or a communication device located remote from the at least one railcar;

identifying a time when an air pressure of a brake system is reduced in each said railcar of the plurality of railcars; and determining an order of the railcars in the train consist based on the times at which air pressures of the brake systems where reduced.

21. A system, comprising:

a brake system configured to apply a braking force to wheels of at least one railcar;

at least one first sensor device configured to sense a mechanical load or have the mechanical load applied thereto when the braking force is being applied to the wheels of the at least one railcar;

a computing device configured to:
  receive an electrical signal from the at least one first sensor device;
  analyze the electrical signal to assess an operational condition of the brake system of the at least one railcar; and
  cause the operational condition to be provided to an operator of the at least one railcar or a communication device located remote from the at least one railcar;

wherein application of the mechanical load to the at least one first sensor is at least partially caused because the at least one first sensor mechanically couples an articulating rigging of the brake system to a non-articulating underframe of the at least one railcar.

22. The system according to claim 21, further comprising an accelerometer or gyroscope configured to monitor attributes of the at least one railcar, and wherein the operational condition of the brake system is assessed by further analyzing an output from the accelerometer or gyroscope.

23. The system according to claim 22, wherein the computing device is further configured to generate an alert regarding a braking force associated with the at least one railcar based on the analyzing of the output from the accelerometer or gyroscope.

24. The system according to claim 22, wherein the computing device is further configured to display in near real-time a visual alert of a malfunctioning brake of the at least one railcar based on the analyzing of the output from the accelerometer or gyroscope.

25. The system according to claim 21, wherein the computing device is further configured to:

obtain information specifying a position of a valve, the valve having a first position indicating that the at least one railcar is loaded and a second position indicating that the at least one railcar is empty; and modify an amount of air to be supplied to a brake cylinder during braking operations of the at least one railcar based on the position of the valve.

26. The system according to claim 25, wherein the amount of air is increased when the valve is in the first position and the amount of air is reduced when the valve is in the second position.

27. The system according to claim 21, further comprising:

a pressure switch configured to monitor an air pressure in a brake pipe of the brake system; and wherein the computing device is further configured to:
  detect when the air pressure increases above a first threshold value or decreases below a second threshold value;
  trigger at least one pressure reading by the pressure switch in response to a detection that the air pressure increased above the first threshold or decreased below the second threshold;
  receive first sensor data from the pressure switch that indicates the at least one pressure reading; and
  generate a message containing the first sensor data and a time of at which the at least one pressure reading was triggered.

28. The system according to claim 27, further comprising:

a pressure sensor configured to performing operations to continually sample the air pressure in the brake pipe at a sampling rate;

wherein the computing device is further configured to receive second sensor data from the pressure sensor that indicates the air pressure in the brake pipe over a duration of time; and wherein the message additionally contains the second sensor data.

29. The system according to claim 28, wherein the computing device is further configured to adjust the sampling rate of the pressure sensor based on an operational state of the at least one railcar.

30. The system according to claim 29, wherein the operational state comprises parked or operating.

31. The system according to claim 21, further comprising:

a sensor configured to perform operations to detect changes in a length of a slack adjuster in the brake system; and wherein the operational condition of the brake system is assessed by further analyzing an output from the sensor.

32. The system according to claim 21, further comprising:

a sensor configured to perform operations to sample a tread temperature of at least one said wheel of the at least one railcar at a sampling rate; and wherein the operational condition of the brake system is assessed by further analyzing an output from the sensor.

33. The system according to claim 32, wherein the sampling rate is adjusted based on an operational state of the at least one railcar.

34. The system according to claim 33, wherein the operational state comprises parked or operating.

35. The system according to claim 32, wherein the sensor is mounted at a location on the at least one railcar that provides the sensor with an unobstructed line-of-sight to a tread of the at least one said wheel.

36. The system according to claim 21, wherein the computing device is further configured to:
receive an indication that a threshold event has occurred at the at least one railcar, the threshold event occurring when an amount of the brake force being applied to the wheels of the at least one railcar reaches a certain value;
cause enablement of a timer responsive to the indication that the threshold event has occurred at the at least one railcar; and
determine whether the threshold event has occurred at one or more other railcars of a plurality of railcars during a predetermined period of time.

37. The system according to claim 36, wherein the computing device concludes that a brake system of at least one of the plurality of railcars is malfunctioning when the threshold event did not occur thereat during the predetermined period of time.

38. The method system to claim 21, wherein the computing device is further configured to:
identify a time when an air pressure of a brake system is reduced in each said railcar of the plurality of railcars; and
determining an order of the railcars in the train consist based on the times at which air pressures of the brake systems where reduced.

39. A system, comprising:
a brake system configured to apply a braking force to wheels of at least one railcar;
at least one first sensor device configured to sense a mechanical load or have the mechanical load applied thereto when the braking force is being applied to the wheels of the at least one railcar;
a computing device configured to:
receive an electrical signal from the at least one first sensor device;
analyze the electrical signal to assess an operational condition of the brake system of the at least one railcar; and
cause the operational condition to be provided to an operator of the at least one railcar or a communication device located remote from the at least one railcar;
wherein application of the mechanical load to the at least one first sensor is at least partially caused because the at least one first sensor is located at a location within an articulating rigging of the brake system that is downstream from a brake lever of the brake system.

40. The system according to claim 39, wherein the location resides between two rods of the articulating rigging of the brake system.

* * * * *